United States Patent
Zach et al.

(10) Patent No.: US 11,659,383 B2
(45) Date of Patent: May 23, 2023

(54) METHOD FOR PHYSICAL LAYER SECURED MESSAGE SCRAMBLING

(71) Applicant: QUALCOMM Incorporated, San Diego, CA (US)

(72) Inventors: Noam Zach, Kiryat Ono (IL); Guy Wolf, Rosh Haayin (IL); Sharon Levy, Binyamina (IL); Ory Eger, Tel Aviv (IL); Ori Ben Shahar, Petach Tikva (IL); Lior Uziel, Hod Hasharon (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/180,596

(22) Filed: Feb. 19, 2021

(65) Prior Publication Data

US 2022/0272527 A1 Aug. 25, 2022

(51) Int. Cl.
| | |
|---|---|
| *H04W 4/00* | (2018.01) |
| *H04W 12/037* | (2021.01) |
| *H04W 12/63* | (2021.01) |
| *H04W 12/041* | (2021.01) |
| *H04L 5/00* | (2006.01) |

(52) U.S. Cl.
CPC ......... *H04W 12/037* (2021.01); *H04L 5/0055* (2013.01); *H04W 12/041* (2021.01); *H04W 12/63* (2021.01)

(58) Field of Classification Search
CPC .......................... H04W 12/037; H04W 12/041
See application file for complete search history.

(56) References Cited

U.S. PATENT DOCUMENTS

| 7,600,121 B2 * | 10/2009 | Davin ................... H04L 63/04 |
| | | 713/400 |
| 9,883,383 B1 * | 1/2018 | Chintalapudi ...... H04W 12/033 |
| | (Continued) | |

FOREIGN PATENT DOCUMENTS

| CN | 110213767 A | 9/2019 |
| CN | 111669730 A | 9/2020 |
| WO | WO-2021008685 A1 | 1/2021 |

OTHER PUBLICATIONS

International Search Report and Written Opinion—PCT/US2022/070569—ISA/EPO—dated Jun. 9, 2022.
(Continued)

*Primary Examiner* — Shantell L Heiber
(74) *Attorney, Agent, or Firm* — Holland & Hart LLP

(57) ABSTRACT

Methods, systems, and devices for wireless communications are described. A first wireless device may communicate, with a second wireless device, a first set of messages of a first message type that are acknowledged according to an acknowledgement procedure. The first wireless device, the second wireless device, or both may select a first subset of messages of the first plurality of messages and a first subset of bits from each message of the first subset of messages based on the first set of messages being acknowledged and according to a sampling configuration common to both the first wireless device and the second wireless device. The first wireless device, the second wireless device, or both may generate a key using bit values of the first subset of bits from each message of the first subset of messages, encoding a message using the key, and communicate the encoded message using the key.

30 Claims, 15 Drawing Sheets

(56) References Cited

U.S. PATENT DOCUMENTS

| | | | | |
|---|---|---|---|---|
| 2005/0221797 A1* | 10/2005 | Howard | ............. | H04W 12/037 |
| | | | | 455/411 |
| 2009/0214028 A1* | 8/2009 | Schneider | ............. | H04L 9/3242 |
| | | | | 380/44 |
| 2013/0073852 A1* | 3/2013 | Oba | ................... | H04W 12/106 |
| | | | | 713/168 |
| 2016/0057156 A1* | 2/2016 | Lin | ...................... | H04W 12/02 |
| | | | | 713/170 |

OTHER PUBLICATIONS

Zhang, J., et al., "Securing Wireless Communications of the Internet of Things from the Physical Layer, An Overview", Entropy, vol. 19, No. 8, Aug. 18, 2017 (Aug. 18, 2017), p. 420, XP055661156, 16 Pages, www.mdpi.com/journal/entropy, CH ISSN: 1099-4300, DOI: 10.3390/e19080420, Sections 1, 2, 4.

* cited by examiner

METHOD FOR PHYSICAL LAYER SECURED MESSAGE SCRAMBLING

FIELD OF TECHNOLOGY

The following relates to wireless communications, including a method for physical layer secured message scrambling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications systems may support communications between a first device (e.g., a UE, a base station, or other internet of things (IoT) devices) and a second device. However, such communications may be vulnerable to security threats (e.g., the communications may be intercepted by a third device).

SUMMARY

The described techniques relate to improved methods, systems, devices, and apparatuses that support a method for physical layer secured message scrambling. Generally, the described techniques may enable wireless devices to determine symmetric keys using a sampling configuration for messages exchanged between the devices, which may result in enhanced security of communications while maintaining relatively efficient communications (e.g., low signaling overhead). As an illustrative example, a first wireless device may communicate a first set of messages with a second wireless device. In some examples, the first set of messages may be messages that are acknowledged according to an acknowledgment procedure (e.g., the second wireless device or the first wireless device may send an acknowledgment (ACK) or a negative ACK (NACK) in response to receiving a message of the first set of messages). The first wireless device and the second wireless device may generate a key based on the first set of messages. For example, the first wireless device may select bits from a subset of the first set of messages in accordance with a sampling configuration. The first wireless device may generate a key based on the selected bits (e.g., the key may include the bit values of the selected bits) for scrambling or descrambling messages communicated between the first wireless device and the second wireless device.

A method for wireless communication at a first wireless device is described. The method may include communicating, with a second wireless device, a first set of multiple messages of a first message type that are acknowledged according to an acknowledgement procedure, selecting, based on the first set of multiple messages being acknowledged and according to a sampling configuration common to both the first wireless device and the second wireless device, a first subset of messages of the first set of multiple messages and a first subset of bits from each message of the first subset of messages, generating a key using bit values of the first subset of bits from each message of the first subset of messages, encoding a message using the key, and transmitting the encoded message to the second wireless device.

An apparatus for wireless communication at a first wireless device is described. The apparatus may include a processor, memory coupled with the processor, and instructions stored in the memory. The instructions may be executable by the processor to cause the apparatus to communicate, with a second wireless device, a first set of multiple messages of a first message type that are acknowledged according to an acknowledgement procedure, select, based on the first set of multiple messages being acknowledged and according to a sampling configuration common to both the first wireless device and the second wireless device, a first subset of messages of the first set of multiple messages and a first subset of bits from each message of the first subset of messages, generate a key using bit values of the first subset of bits from each message of the first subset of messages, encode a message using the key, and transmit the encoded message to the second wireless device.

Another apparatus for wireless communication at a first wireless device is described. The apparatus may include means for communicating, with a second wireless device, a first set of multiple messages of a first message type that are acknowledged according to an acknowledgement procedure, means for selecting, based on the first set of multiple messages being acknowledged and according to a sampling configuration common to both the first wireless device and the second wireless device, a first subset of messages of the first set of multiple messages and a first subset of bits from each message of the first subset of messages, means for generating a key using bit values of the first subset of bits from each message of the first subset of messages, means for encoding a message using the key, and means for transmitting the encoded message to the second wireless device.

A non-transitory computer-readable medium storing code for wireless communication at a first wireless device is described. The code may include instructions executable by a processor to communicate, with a second wireless device, a first set of multiple messages of a first message type that are acknowledged according to an acknowledgement procedure, select, based on the first set of multiple messages being acknowledged and according to a sampling configuration common to both the first wireless device and the second wireless device, a first subset of messages of the first set of multiple messages and a first subset of bits from each message of the first subset of messages, generate a key using bit values of the first subset of bits from each message of the first subset of messages, encode a message using the key, and transmit the encoded message to the second wireless device.

In some examples of the method, apparatuses, and non-transitory computer-readable medium described herein, the sampling configuration includes a sampling frequency for a systematic sampling of the first set of multiple messages, one or more indices indicating bits to sample from selected messages of the first set of multiple messages, an indication of the first message type, or any combination thereof.

Some examples of the method, apparatuses, and non-transitory computer-readable medium described herein may further include operations, features, means, or instructions for receiving the sampling configuration from the second wireless device, where the first wireless device includes a first user equipment (UE) and the second wireless device includes a base station or a second UE and transmitting the sampling configuration to the second wireless device, where the first wireless device includes the base station or the second UE and the second wireless device includes the first UE.

Some examples of the method, apparatuses, and non-transitory computer-readable medium described herein may further include operations, features, means, or instructions for communicating, with the second wireless device, a second set of multiple messages of the first message type after the first set of multiple messages of the first message type may be communicated, selecting, according to the sampling configuration, the first subset of bits from a message of the second set of multiple messages of the first message type, removing, from the key, the first subset of bits associated with a first message of the first subset of messages of the first set of multiple messages, and adding, to the key, the first subset of bits from the message of the second set of multiple messages of the first message type.

Some examples of the method, apparatuses, and non-transitory computer-readable medium described herein may further include operations, features, means, or instructions for communicating, with the second wireless device, a second set of multiple messages of the first message type after the first set of multiple messages of the first message type may be communicated, selecting, according to the sampling configuration, a second subset of messages of the second set of multiple messages and a second subset of bits from each message of the second subset of messages, and generating an updated key using bit values of the second subset of bits from each message of the second subset of messages.

Some examples of the method, apparatuses, and non-transitory computer-readable medium described herein may further include operations, features, means, or instructions for communicating, with the second wireless device, a second set of multiple messages of a second message type that may be acknowledged according to the acknowledgement procedure and selecting, according to the sampling configuration, a second subset of messages of the second set of multiple messages and a second subset of bits from each message of the second subset of messages, where the key may be generated both using the bit values of the first subset of bits from each message of the first subset of messages and using bit values of the second subset of bits from each message of the second subset of messages.

Some examples of the method, apparatuses, and non-transitory computer-readable medium described herein may further include operations, features, means, or instructions for communicating the first set of multiple messages includes receiving the first set of multiple messages from the second wireless device or transmitting the first set of multiple messages to the second wireless device and communicating the second set of multiple messages includes receiving the second set of multiple messages from the second wireless device or transmitting the second set of multiple messages to the second wireless device.

In some examples of the method, apparatuses, and non-transitory computer-readable medium described herein, selecting the first subset of messages of the first set of multiple messages may include operations, features, means, or instructions for receiving, from the second wireless device, a first message of the first set of multiple messages and a second message of the first set of multiple messages, transmitting, to the second wireless device, a positive acknowledgement in response to a successful decoding of the first message and a negative acknowledgement in response to an unsuccessful decoding of the second message, selecting the first message as one of the first subset of messages based on transmitting the positive acknowledgement for the first message, and determining to exclude the second message as one of the first subset of messages based on transmitting the negative acknowledgement for the second message.

In some examples of the method, apparatuses, and non-transitory computer-readable medium described herein, selecting the first subset of messages of the first set of multiple messages may include operations, features, means, or instructions for transmitting, to the second wireless device, a first message of the first set of multiple messages and a second message of the first set of multiple messages, receiving, from the second wireless device, a positive acknowledgement in response to a successful decoding of the first message and a negative acknowledgement in response to an unsuccessful decoding of the second message, selecting the first message as one of the first subset of messages based on transmitting the positive acknowledgement for the first message, and determining to exclude the second message as one of the first subset of messages based on transmitting the negative acknowledgement for the second message.

Some examples of the method, apparatuses, and non-transitory computer-readable medium described herein may further include operations, features, means, or instructions for selecting the first subset of messages and the first subset of bits, and generating the key, and encoding the message using the key may be performed at a physical layer of the first wireless device, the message received from a media access control layer before being encoded using the key.

In some examples of the method, apparatuses, and non-transitory computer-readable medium described herein, the encoded message lacks security encoding performed at a layer of the first wireless device higher than the physical layer.

In some examples of the method, apparatuses, and non-transitory computer-readable medium described herein, the first message type includes transport blocks, or channel state information reports, or a combination thereof.

In some examples of the method, apparatuses, and non-transitory computer-readable medium described herein, the first message type includes unicast messages.

In some examples of the method, apparatuses, and non-transitory computer-readable medium described herein, the sampling configuration indicates a threshold duration of time over which the communicating of the first subset of messages may be to occur, and the selecting of the first subset of messages of the first set of multiple messages may be based on the first subset of messages satisfying the threshold duration of time.

In some examples of the method, apparatuses, and non-transitory computer-readable medium described herein, at least a first message of the first subset of messages may be associated with a first location of the second wireless device, and at least a second message of the first subset of messages may be associated with a second location of the second wireless device different than the first location.

In some examples of the method, apparatuses, and non-transitory computer-readable medium described herein, the communicating of the first set of multiple messages may be associated with a first one or more locations of the second wireless device and the method, apparatuses, and non-transitory computer-readable medium may include further operations, features, means, or instructions for communicating, with the second wireless device, a second set of multiple messages that may be associated with a second location of the second wireless device, the second location being different from the first one or more locations and updating, based on the second wireless device communicating the second set of multiple messages associated with the second location, the key using a subset of messages of the second set of multiple messages according to the sampling configuration, wherein a first set of bits of the key are associated with a first location of the first one or more locations and a second set of bits of the key are associated with the second location.

In some examples of the method, apparatuses, and non-transitory computer-readable medium described herein, the communicating of the first set of multiple messages may be associated with a first location of the second wireless device and the method, apparatuses, and non-transitory computer-readable medium may include further operations, features, means, or instructions for communicating, with the second wireless device, a second set of multiple messages associated with the first location of the second wireless device, communicating a signal indicating to refrain from transmitting encrypted messages based at least in part on determining that the second plurality of messages are associated with a same location of the first wireless device as the first plurality of messages, and transmitting, to the second wireless device, a second message that may be an unencrypted message based on determining that the second set of multiple messages may be associated with a same location of the first wireless device as the first set of multiple messages.

A method for wireless communication at a first wireless device is described. The method may include communicating, with a second wireless device, a first set of multiple messages of a first message type that are acknowledged according to an acknowledgement procedure, selecting, according to a sampling configuration common to both the first wireless device and the second wireless device, a first subset of messages of the first set of multiple messages and a first subset of bits from each message of the first subset of messages, generating a key using bit values of the first subset of bits from each message of the first subset of messages, receiving a message from the second wireless device, and performing a decoding procedure on the message using the key.

An apparatus for wireless communication at a first wireless device is described. The apparatus may include a processor, memory coupled with the processor, and instructions stored in the memory. The instructions may be executable by the processor to cause the apparatus to communicate, with a second wireless device, a first set of multiple messages of a first message type that are acknowledged according to an acknowledgement procedure, select, according to a sampling configuration common to both the first wireless device and the second wireless device, a first subset of messages of the first set of multiple messages and a first subset of bits from each message of the first subset of messages, generate a key using bit values of the first subset of bits from each message of the first subset of messages, receive a message from the second wireless device, and perform a decoding procedure on the message using the key.

Another apparatus for wireless communication at a first wireless device is described. The apparatus may include means for communicating, with a second wireless device, a first set of multiple messages of a first message type that are acknowledged according to an acknowledgement procedure, means for selecting, according to a sampling configuration common to both the first wireless device and the second wireless device, a first subset of messages of the first set of multiple messages and a first subset of bits from each message of the first subset of messages, means for generating a key using bit values of the first subset of bits from each message of the first subset of messages, means for receiving a message from the second wireless device, and means for performing a decoding procedure on the message using the key.

A non-transitory computer-readable medium storing code for wireless communication at a first wireless device is described. The code may include instructions executable by a processor to communicate, with a second wireless device, a first set of multiple messages of a first message type that are acknowledged according to an acknowledgement procedure, select, according to a sampling configuration common to both the first wireless device and the second wireless device, a first subset of messages of the first set of multiple messages and a first subset of bits from each message of the first subset of messages, generate a key using bit values of the first subset of bits from each message of the first subset of messages, receive a message from the second wireless device, and perform a decoding procedure on the message using the key.

Some examples of the method, apparatuses, and non-transitory computer-readable medium described herein may further include operations, features, means, or instructions for communicating the sampling configuration with the second wireless device, where the sampling configuration includes a sampling frequency for a systematic sampling of the first set of multiple messages, one or more indices indicating bits to sample from selected messages of the first set of multiple messages, an indication of the first message type, or any combination thereof.

Some examples of the method, apparatuses, and non-transitory computer-readable medium described herein may further include operations, features, means, or instructions for receiving the sampling configuration from the second wireless device, where the first wireless device includes a first UE and the second wireless device includes a base station or a second UE and transmitting the sampling configuration to the second wireless device, where the first wireless device includes the base station or the second UE and the second wireless device includes the first UE.

Some examples of the method, apparatuses, and non-transitory computer-readable medium described herein may further include operations, features, means, or instructions for communicating, with the second wireless device, a second set of multiple messages of the first message type after the first set of multiple messages of the first message type may be communicated, selecting, according to the sampling configuration, the first subset of bits from a message of the second set of multiple messages of the first message type, removing, from the key, the first subset of bits associated with a first message of the first subset of messages of the first set of multiple messages, and adding, to the key, the first subset of bits from the message of the second set of multiple messages of the first message type.

Some examples of the method, apparatuses, and non-transitory computer-readable medium described herein may further include operations, features, means, or instructions for communicating, with the second wireless device, a second set of multiple messages of the first message type after the first set of multiple messages of the first message type may be communicated, selecting, according to the sampling configuration, a second subset of messages of the second set of multiple messages and a second subset of bits from each message of the second subset of messages, and generating an updated key using bit values of the second subset of bits from each message of the second subset of messages.

Some examples of the method, apparatuses, and non-transitory computer-readable medium described herein may further include operations, features, means, or instructions for communicating, with the second wireless device, a second set of multiple messages of a second message type that may be acknowledged according to the acknowledgement procedure and selecting, according to the sampling configuration, a second subset of messages of the second set of multiple messages and a second subset of bits from each message of the second subset of messages, where the key may be generated both using the bit values of the first subset of bits from each message of the first subset of messages and using bit values of the second subset of bits from each message of the second subset of messages.

In some examples of the method, apparatuses, and non-transitory computer-readable medium described herein, the first message type includes transport blocks, or channel state information reports, or a combination thereof.

DETAILED DESCRIPTION

Figure 1:
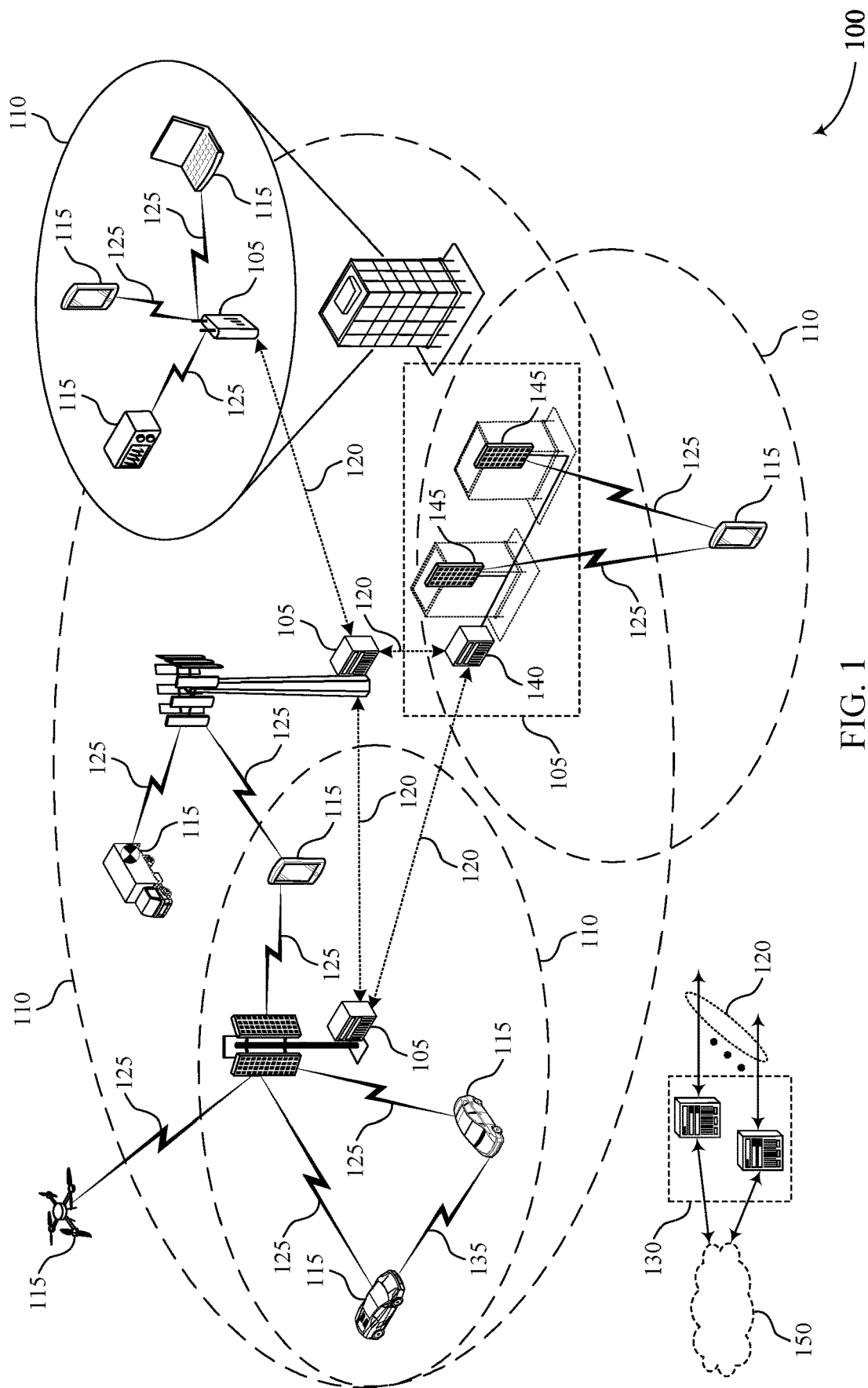
FIG. 1 illustrates an example of a wireless communications system that supports a method for physical layer secured message scrambling in accordance with aspects of the present disclosure.

Some wireless communications may support communications between various wireless devices (e.g., a user equipment (UE) and a base station, multiple UEs, or other examples of wireless devices such as internet of things (IoT) devices). For example, two wireless devices may communicate messages or signals using a communication link (e.g., an access link, a sidelink, and the like). In some examples, such communications may be vulnerable to security threats. For example, a third device may attempt to intercept the communications via the communication link. Additionally or alternatively, some devices (e.g., IoT devices in a fifth generation (5G) new radio (NR) network) may be designed to be relatively small, cheap, or power efficient. In such cases, relatively complex cryptographic (e.g., encryption/decryption, encoding/decoding, scrambling/descrambling) methods for security purposes may not be feasible for such devices. For example, such relatively complex cryptographic methods may introduce a relatively high amount of processing or signaling overhead and result in reduced communications efficiency, power efficiency, or both.

Accordingly, the techniques described herein may enable wireless devices to determine a key for encoding (which may also be referred to as scrambling or encrypting herein) or decoding (which may also be referred to as descrambling or decrypting herein) messages (e.g., at a physical layer), which may result in secure communications while maintaining relatively low processing or signal overhead for the devices. Encoding may also be referred to as scrambling or encrypting herein. Decoding may also be referred to as descrambling or decrypting herein. For example, wireless devices may determine symmetric keys using a sampling configuration for messages exchanged between the devices. The wireless devices may encode or decode communications using the determined key. As an illustrative example, a first wireless device may communicate a first set of messages with a second wireless device and generate a key based on the communicated messages. In some examples, the first set of messages may be messages that are acknowledged according to an acknowledgment procedure (e.g., the second wireless device or the first wireless device may send an acknowledgment (ACK) or a negative ACK (NACK) in response to receiving a message of the first set of messages). In some examples, the set of messages may include a first message type, a second message type, or any combination thereof, among other examples of message types. An example of a downlink message type includes transport blocks. Some examples of uplink messages types include transport blocks or channel state feedback (e.g., channel state information reports). Other acknowledged message types, downlink or uplink, may be used consistent with the examples described herein. For example, any data information, report, message, etc., that is acknowledged may be an example of a message type for uplink communications, downlink communications, or both.

The first wireless device may select bits from a subset of the messages in accordance with a sampling configuration. In some examples, the sampling configuration may be pre-configured at the wireless devices or the second wireless device may indicate the sampling configuration to the first wireless device. The sampling configuration may indicate or include a sampling frequency for a systematic sampling of the first set of messages (e.g., a wireless device may select every 100th message in the first set of messages based on the sampling frequency). Additionally or alternatively, the sampling configuration may include one or more indices indicating bits to sample from the selected messages (e.g., one or more bits of a selected message may be indicated by the indices). For example, the first wireless device may use bit values of a first bit of each selected message to generate a key. Additionally or alternatively, the second wireless device may generate a symmetrical key using the same sampling configuration and messages communicated between the first wireless device and the second wireless device. Thus, the first wireless device and the second wireless device may communicate messages encoded using symmetrical or the same keys known to both devices.

Various aspects of the subject matter described herein may be implemented to realize one or more of the following potential advantages. The techniques employed by the described devices may provide benefits and enhancements to the operation of the devices. For example, operations performed by the wireless devices may provide improvements to security and efficiency in communications between the wireless devices. For example, the wireless devices may be enabled to scramble communications using a device specific key or root based on historical information bits communicated between the devices, which may result in improved security while maintaining relatively high communications efficiency (e.g., the wireless devices may generate the keys without explicit signaling of the keys between the devices or with third parties, or performing processing-intensive cryptographic methods). Such techniques may be useful in various different situations, such as in cases where another device is attempting to intercept physical layer communications and may be unable to successfully decode the scrambled bits because the intercepting device is unlikely to have access to such historical bit information. The described techniques may thus include features for improvements to reliability, security, and efficiency in communications, among other advantages.

Aspects of the disclosure are initially described in the context of wireless communications systems. Aspects of the disclosure are then described in the context of scrambling schemes and process flows. Aspects of the disclosure are further illustrated by and described with reference to apparatus diagrams, system diagrams, and flowcharts that relate to a method for physical layer secured message scrambling.

FIG. 1 illustrates an example of a wireless communications system 100 that supports a method for physical layer secured message scrambling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval. As one example, a wireless device may transmit feedback indicating an ACK for a successfully received message or a NACK for a message that was not received or unsuccessfully decoded.

In some examples, communications between a first wireless device and a second wireless device in the wireless communications system 100 may be vulnerable to security threats. For example, a third device may attempt to intercept the communications via the communication link. In some examples, higher layer signaling in the system may implement encryption techniques to provide enhanced security. However, it may be relatively difficult to implement security key techniques and management in a physical layer due to power, size, or cost constraints for devices (e.g., relatively complex cryptographic methods may introduce processing or signaling for key generation that exceeds the capabilities of some devices or introduces relatively inefficient communications).

Accordingly, the techniques described herein may enable devices of the wireless communications system 100 to implement physical layer security (PLS) to support secure communications while maintaining relatively efficient communications and processing. For example, the techniques may enable wireless devices to determine a key for scrambling or descrambling messages (e.g., on a physical layer), which may result in secure communications while maintaining relatively low processing or signal overhead for the devices. For example, wireless devices may determine symmetric keys using a sampling configuration for messages exchanged between the devices. The wireless devices may scramble (e.g., encode) or descramble (e.g., decode) communications using a determined key. As an illustrative example, a first wireless device may communicate a first set of messages with a second wireless device and generate a key based on the communicated messages. In some examples, the first set of messages may be messages that are acknowledged according to an acknowledgment procedure (e.g., the second wireless device or the first wireless device may send an ACK or a NACK in response to receiving a message of the first set of messages). In some examples, the set of messages may include a first message type, a second message type, or any combination thereof, among other examples of message types. An example of a downlink message type includes transport blocks. Some examples of uplink messages types include transport blocks or channel state feedback (e.g., channel state information reports). Other acknowledged message types, downlink or uplink, may be used consistent with the examples described herein.

The first wireless device may select bits from a subset of the messages in accordance with a sampling configuration. In some examples, the sampling configuration may be pre-configured at the wireless devices or the second wireless device may indicate the sampling configuration to the first wireless device. The sampling configuration may indicate or include a sampling frequency for a systematic sampling of the first set of messages (e.g., a wireless device may select every 100th message in the first set of messages based on the sampling frequency). Additionally or alternatively, the sampling configuration may include one or more indices indicating bits to sample from the selected messages (e.g., one or more bits of a selected message may be indicated by the indices). For example, the first wireless device may use bit values of a first bit of each selected message to generate a key. Additionally or alternatively, the second wireless device may generate a symmetrical key using the same sampling configuration and messages communicated between the first wireless device and the second wireless device. Thus, the first wireless device and the second wireless device may communicate messages scrambled using symmetrical or the same keys.

Figure 2:
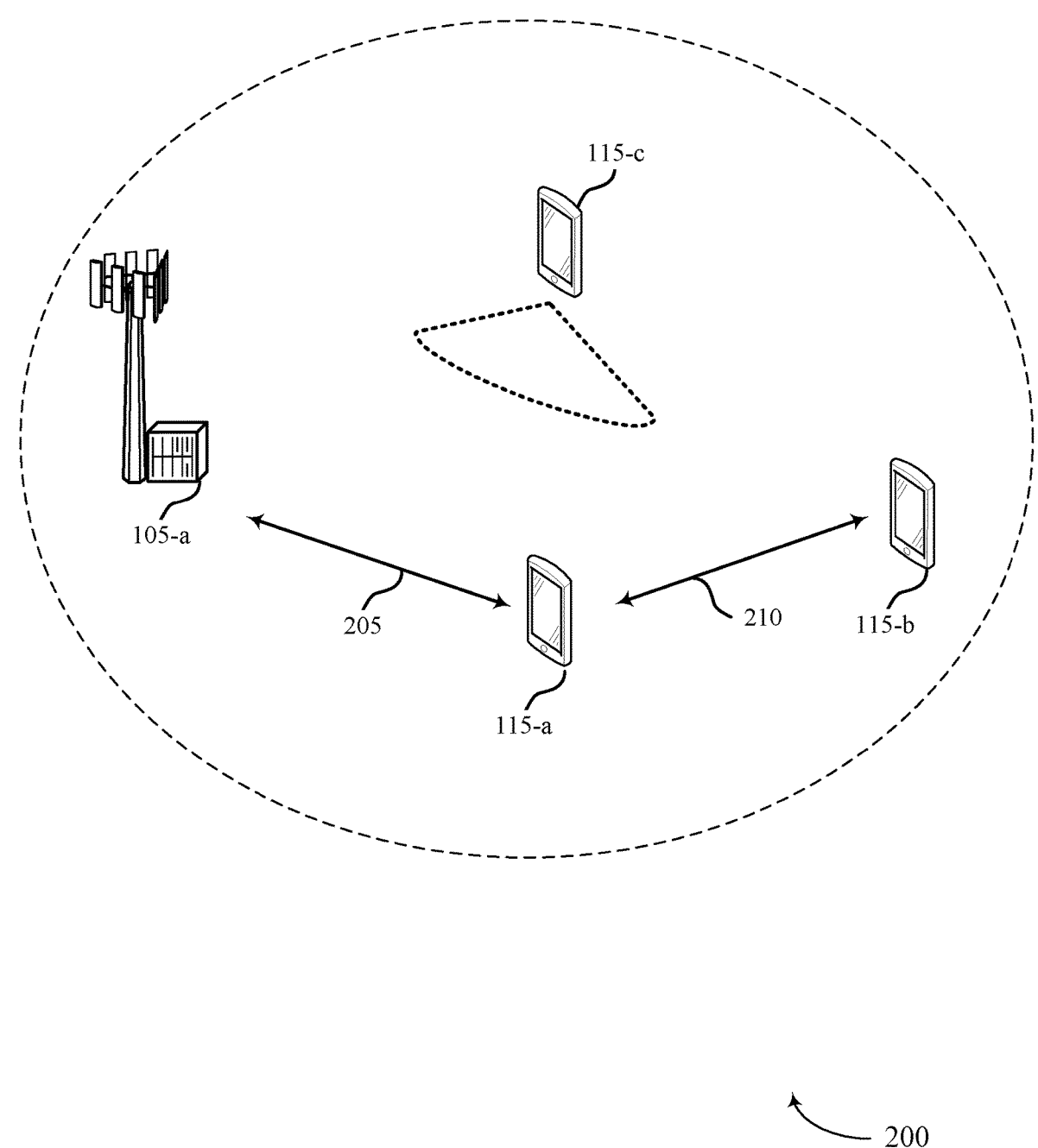
FIG. 2 illustrates an example of a wireless communications system that supports a method for physical layer secured message scrambling in accordance with aspects of the present disclosure.

FIG. 2 illustrates an example of a wireless communications system 200 that supports a method for physical layer secured message scrambling in accordance with aspects of the present disclosure. In some examples, the wireless communications system 200 may implement aspects of the wireless communications system 100. For example, the wireless communications system 200 may include UEs 115 and base stations 105, which may be examples of the corresponding devices as described with reference to FIG. 1. In some examples, the operations described in the wireless communications system 200 may be performed at other devices or in different orders. For example, while some communications are described between the base station 105-a and the UE 115-a over the access link 205, the operations described herein may be applied for communications between the UE 115-a and the UE 115-b over the sidelink 210, among other examples of wireless devices and communications.

The base station 105-a may communicate with the UE 115-a via the access link 205. For example, the base station 105-a may transmit downlink communications to the UE 115-a and receive uplink communications from the UE 115-a using the access link 205. In some examples, communications between a first wireless device (e.g., the base station 105-a or the UE 115-a) and a second wireless device (e.g., the UE 115-a or the UE 115-b) in the wireless communications system 100 may be vulnerable to security threats. For example, the UE 115-c may be an example of an intercepting wireless device (e.g., an eavesdropper device attempting to listen or otherwise intercept communications between the first wireless device and the second wireless device). In some examples, higher layer signaling in the system may implement encryption techniques to provide enhanced security. However, it may be relatively difficult to implement security key techniques and management in a physical layer due to power, size, or cost constraints for wireless devices (e.g., relatively complex cryptographic methods may introduce processing or signaling for key generation that exceeds the capabilities of some devices or introduces relatively inefficient communications).

Accordingly, the UE 115-a and the base station 105-a may implement a device-specific secured scrambling of communications based on historical information (e.g., information communicated between the base station 105-a and the target UE 115-a). For example, the wireless devices may encode data, control information, reports, security keys, or any combination thereof (among other examples of information and messages) using a UE specific secured key or root based on previous messages communicated between the UE 115-a and the base station 105-a. The UE 115-a and the base station 105-a may determine a key for encoding or decoding messages (e.g., on a physical layer), which may result in secure communications while maintaining relatively low processing or signal overhead for the devices. For example, the wireless devices may determine symmetric keys using a sampling configuration for messages exchanged between the devices. The wireless devices may scramble (e.g., encode) or descramble (e.g., decode) communications using the determined key.

As an illustrative example, the base station 105-a may communicate a first set of messages with the UE 115-a. The UE 115-a, the base station 105-a, or both may generate a key based on the communicated messages. In some examples, the first set of messages may be messages that are acknowledged according to an acknowledgment procedure. For example, the UE 115-a (or the base station 105-a) may transmit an ACK or a NACK indication in feedback in response to receiving the first set of messages. In some examples, the set of messages may include a first message type (e.g., transport blocks (TBs) for downlink communications), a second message type (e.g., channel state information reports for uplink communications), or any combination thereof, among other examples of message types. For example, the first message type or the second message type may be downlink messages that the UE 115-a is configured to provide feedback in response to receiving the messages. Additionally or alternatively, the first message type or the second message type may be uplink messages that the base station 105-a is configured to provide feedback in response to receiving the messages.

The UE 115-a, or the base station 105-a, may generate a key using the first set of messages communicated between the UE 115-a and the base station 105-a. For example, the UE 115-a may select a first subset of messages from the first set of messages in accordance with a sampling configuration. In some examples, the sampling configuration may be pre-configured at one or more of the wireless devices (e.g., the UE 115-a, the base station 105-a, or both may be pre-configured with the sampling configuration). Additionally or alternatively, the wireless devices may receive signaling (e.g., control signaling) indicating the sampling configuration. For example, the base station 105-a may transmit control signaling indicating one or more parameters of the sampling configuration to the UE 115-a. Such control signaling may include a downlink control information (DCI) message, an RRC message, a MAC-CE message, or any combination thereof.

The sampling configuration may include a sampling frequency for a systematic sampling of the first set of messages. For example, the sampling frequency may indicate a quantity of messages between sampling a first message and sampling a second message of the first set of messages. As an illustrative example, the UE 115-a or the base station 105-a may select every 100th message in the first set of messages if the sampling frequency is 100, although any quantity of messages or frequency may be used. Accordingly, the wireless devices may select a first subset of the first set of messages for determining a key. In some examples, the first set of messages may be messages associated with an ACK feedback response. For example, the wireless devices may select every 100th message of a first set of messages that were successfully received (e.g., if an ACK was received for a message, a wireless device may include the message in the first set of messages, if a NACK was received for the message, the wireless device may exclude the message from the first set of messages and not increment a count of messages toward the sampling frequency).

In some examples, the sampling configuration may include or indicate which bits to select (e.g., sample) from the selected first subset of messages. In other words, the sampling configuration may include one or more indices indicating respective bits of a selected message to sample for key generation. As an illustrative example, a wireless device (e.g., the base station 105-a, the UE 115-a, or both) may identify an index of one based on the sampling configuration, which may indicate that the first bit of a selected message (e.g., the first bit of each message in the sampled first subset of messages) is designated for selection as part of key generation at the wireless devices. For instance, the wireless device may select the first bit of one message out of every 100 messages of the first set of messages if the sampling configuration indicates a sampling frequency of 100 and an index of 1, although any quantity or type of indices or sampling frequencies may be implemented. For example, the sampling configuration may indicate a rotating scheme for bit selection (e.g., the wireless device may select every fourth bit, for example a first bit of a first message of the first subset of messages, a fifth bit of a second message of the first subset of messages, a ninth bit of a third message of the first subset of messages, and so on, among other examples of quantities of bits to skip in each message).

Other configurations may additionally or alternatively be implemented or indicated by the sampling configuration (e.g., an alternating configuration in which a device selects a first bit of a first message, a last bit of a second message, a first bit of a third message, and so on). Additionally or alternatively, the sampling configuration may indicate which bits of each message or which messages are used to generate the key based on a synchronic request (e.g., a change in location) or other synchronic mechanisms. As an illustrative example, if a message is associated with a change in location (e.g., the message is sent from a location different than the location of a prior message), the message may be selected for key generation in accordance with the sampling configuration.

Additionally or alternatively, the sampling configuration may include an indication of a first message type. For example, the sampling configuration may indicate that the first set of messages include a first message type (e.g., the wireless devices may select every 100th transport block in the downlink or uplink based on the first message type indicating transport blocks in the downlink or uplink). Additionally or alternatively, the sampling configuration may include an indication of a second message type. For example, the sampling configuration may indicate that the first set of messages include a second message type (e.g., the wireless devices may select every first CSI report of a 10th radio frame based on the second message type indicating CSI report messages, among other examples of sampling frequencies and message types). In some examples, the sampling configuration may indicate a combination of message types as described herein with reference to FIG. 3.

Thus, a wireless device may select messages, bits, or both of the first set of messages to generate a key. For example, the UE 115-a may generate a key using a subset of sampled bits from the first subset of messages (e.g., a first bit value of a first message may be a first bit in a UE specific key or root for encoding a message, a first bit value of a second message may be a second bit in the UE specific key or root for encoding the message, and so on). Additionally or alternatively, the base station 105-a may generate the key using a same sampling configuration, which may enable the UE 115-a and the base station 105-a to determine symmetrical (e.g., the same) keys for subsequent communications (e.g., the keys may enable the wireless devices to encode and decode communications). The key may use any length (e.g., quantity of bits). For example, the devices may be pre-configured with a length for the key, or the devices may receive signaling (e.g., control signaling) indicating the length of the key. In some examples, the devices may generate the key using a same root (e.g., the devices may generate the same key using a root determined from the selected messages or bits or both), among other examples of key or root generation techniques.

In some examples, a wireless device such as the base station 105-a or the UE 115-a may encode a message using the key. For example, the wireless device may perform one or more encoding procedures (e.g., encryption methods, such as Rivest-Shamir-Adleman (RSA) encryption in one example, although any encryption techniques may be used). For example, the wireless device may perform an encoding procedure on data or other information to be transmitted, which may manipulate or modify the string of information bits based on the value of the generated key such that the original string of information bits of the data or information may be relatively difficult to retrieve or decode from the modified string of information bits without use of a symmetrical or same key. Thus, the UE 115-c may be unable to successfully decode and interpret the encoded message. For example, the key generation may be configured such that the historical data for determining the key may occur over a relatively long period of time (e.g., the sampling frequency, length of the key, or both among other examples of parameters, may be configured such that obtaining each of the messages for generating the key may take hours, days, etc.). In such cases, the likelihood that the UE 115-c continuously and successfully tracking the information communicated in the channel may be relatively low, for example, due to changes or variations in a location of the UE 115-a, a velocity of the UE 115-a, channel conditions and corresponding beams or precoding associated with the UE 115-a, interference associated with the UE 115-a, etc.

In some examples, the sampling configuration may indicate a threshold duration of time. For example, the UE 115-a may communicate a first set of messages for a time duration. The UE 115-a may determine whether the time duration satisfies a threshold duration of time of the sampling configuration (e.g., the threshold duration of time may be a relatively long period of time). In some examples, the UE 115-a may generate, update, or refrain from implementing a key based on communicating in one or more locations. For example, the UE 115-a may change locations while communicating a set of messages (e.g., a first message may be communicated in a first location and a second message may be communicated in a second location). The UE 115-a may generate, update, or a combination thereof, the key based on updating the location (e.g., the UE 115-a may communicate encrypted messages based on a changing location of the UE 115-a or another device in communication with the UE 115-a). Additionally or alternatively, the UE 115-a may refrain from encrypting messages if a location is not updated for a threshold duration of time. For example, if the UE 115-a (or another device in communication with the UE 115-a) does not change locations for the threshold duration of time, the UE 115-a may communicate unencrypted messages based on the satisfied threshold duration of time. Thus, the UE 115-a may update keys based on location changes or the UE 115-a may refrain from using secured message exchange (e.g., if a key is considered to be relatively old due, for example if the UE 115-a refraining from moving locations for a threshold duration of time, the other device may indicate to avoid using encryption for subsequent communications) or a combination thereof. For example, a key may be generated from multiple bits that are associated with multiple locations (e.g., the UE 115-a may collect or sample bits at different times and locations and update the key in a first in first out (FIFO) manner where each time a location or time is updated one or more new messages are selected to update the key).

The wireless devices may send communications encoded or decoded using the key. For example, the base station 105-a may transmit an encoded message to the UE 115-a and the UE 115-a may decode the message using a same or symmetrical key generated from the acknowledged first set of messages. In some examples, wireless devices may select the first subset of messages and the first subset of bits, generate the key, and encode the message using the key at a physical layer of the wireless device. In some such examples, the message (e.g., a MAC protocol data unit (PDU)) may be received from a MAC layer before being encoded at the physical (PHY) layer using the key. In some such examples, the encoded message lacks security encoding performed at a layer of the first wireless device higher than the physical layer (e.g., higher layers such as RLC, RRC, PDCP, or NAS layers, may perform additional or alternative encoding with a complexity relatively higher than the encoding performed at the physical layer).

In some examples, the key may be updated by the wireless devices over time. For example, a wireless device may generate a first key based on a first set of messages. In some such examples, the wireless device may communicate a second set of messages and generate a second key using the second set of messages. In other words, the wireless device may completely replace the key from different sets of historical data. Additionally or alternatively, the wireless device may update the key over time in a FIFO manner. For example, the wireless device may communicate a second set of messages and update the bits of the key in accordance with the sampling configuration (e.g., the wireless device may select a first subset of bits from a message of the second set of messages, remove the first subset of bits associated with a first message of the first set of messages from the key, and add the first subset of bits from the message of the second set of messages to the key).

In some examples, the wireless devices may initiate communications with a first key and update the key over time. For example, the wireless devices may be pre-configured with a first key or may receive signaling indicating the first key prior to obtaining historical data for updating, replacing, or both of the first key with a second key. In some other examples, the wireless devices may refrain from encoding messages for communications until enough historical data (e.g., the first set of messages includes enough messages to generate a full length of the key) has been communicated. In some examples, the wireless devices may undergo a handover event. For example, the UE 115-a may move from a first location serviced by the base station 105-a to a second location serviced by another base station 105. In some such examples, the base station 105-a may indicate a current key to the other base station 105-a (e.g., via backhaul or other communication links to the other base station 105) such that the UE 115-a and the other base station 105 may continue communicating using messages encoded via the key. In some other examples, the other base station 105 and the UE 115-a may restart the procedure for key generation as described herein.

Figure 3:
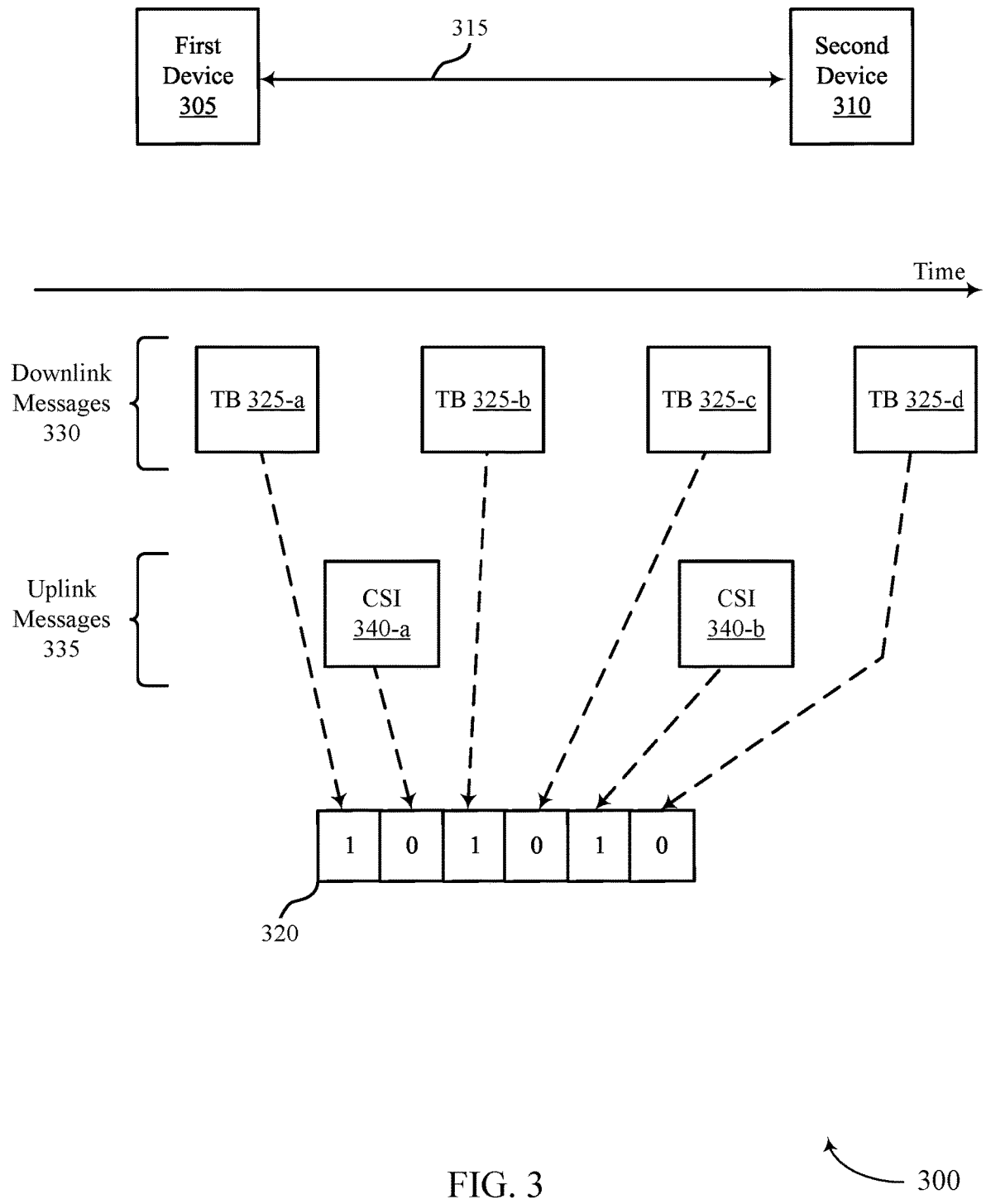
FIG. 3 illustrates an example of a scrambling scheme that supports a method for physical layer secured message scrambling in accordance with aspects of the present disclosure.

FIG. 3 illustrates an example of a scrambling scheme 300 that supports a method for physical layer secured message scrambling in accordance with aspects of the present disclosure. In some examples, the scrambling scheme 300 may implement aspects of wireless communications system 100 or 200. For example, the scrambling scheme 300 may illustrate communications between a first device 305 and a second device 310, which may be examples of wireless devices as described with reference to FIGS. 1 and 2 (e.g., UEs 115, base stations 105, etc.). Generally, the scrambling scheme 300 may illustrate an example key generation procedure for encoding communications based on a sampling configuration for selecting bits from uplink messages 335, downlink messages 330, or a combination thereof to include in a key 320.

The first device 305 and the second device 310 may exchange downlink messages 330 and uplink messages 335 via the communications link 315. The devices may generate a key using at least a portion of such communications as described herein with reference to FIG. 2. For example, a device may receive a TB 325-a. The device may transmit an ACK for the TB 325-a. The device may select the TB 325-a as a first message in a subset of messages of a first set of messages in accordance with a sampling configuration. As an illustrative example, the TB 325-a may be the first message of a first message type (e.g., TBs) in the first set of messages. The device may select the TB 325-b, the TB 325-c, and the TB 325-d in accordance with the sampling configuration. For example, the TB 325-b, the TB 325-c, and the TB 325-d may include 100 messages between each other and the device may select the TBs 325 shown based on a sampling frequency of 100, although any such quantity of TBs, messages, or sampling frequencies may be implemented. Additionally or alternatively, the device may select uplink messages 335 of the first set of messages (or a second set of messages) in accordance with the sampling configuration. For example, the device may select the CSI 340-a of a second message type (e.g., a CSI report message) and a CSI 340-b based on the CSI 340-a and 340-b being a first CSI report of a 10th radio frame, although any quantity or type of messages or sampling frequency may be implemented (e.g., the uplink messages 335 may include the first message type and be an example of uplink TBs).

Thus, the first device 305 and the second device 310 may be enabled to generate the key 320, for example, with relatively little over the air signaling (e.g., no over the air signaling of the bits of the key 320). For example, the devices may select a first subset of bits of a first message for a first portion of the key 320. As an illustrative example, the first bit of the TB 325-a may have a value of 1 and the first bit of the key 320 may have a value of 1, although any quantity of bits may be used, any location of bits may be used (e.g., indices of the sampling configuration may indicate other bits in addition or alternative to the first bit of the TB 325-a), or a combination thereof. In some examples, the first bit of the TB 325-b may have a value of 0 and the second bit of the key 320 may have a value of 0 based on selecting the first bit of the TB 325-b in accordance with a sampling configuration, although any quantity of bits may be used, any location of bits may be used (e.g., indices of the sampling configuration may indicate other bits in addition or alternative to the first bit of the TB 325-a), or a combination thereof. In some examples, other configurations may be used as described herein with reference to FIG. 2. For example, the bits selected from each selected message in the first subset of messages may be alternating (e.g., a first bit from the TB 325-a, a second bit from the TB 325-b, a first bit from the TB 325-c, etc.), rotating (e.g., a first bit from a first message, a second bit from a second message, etc.), and the like. The first device 305 and the second device 310 may exchange communications encoded using the key 320.

Figure 4:
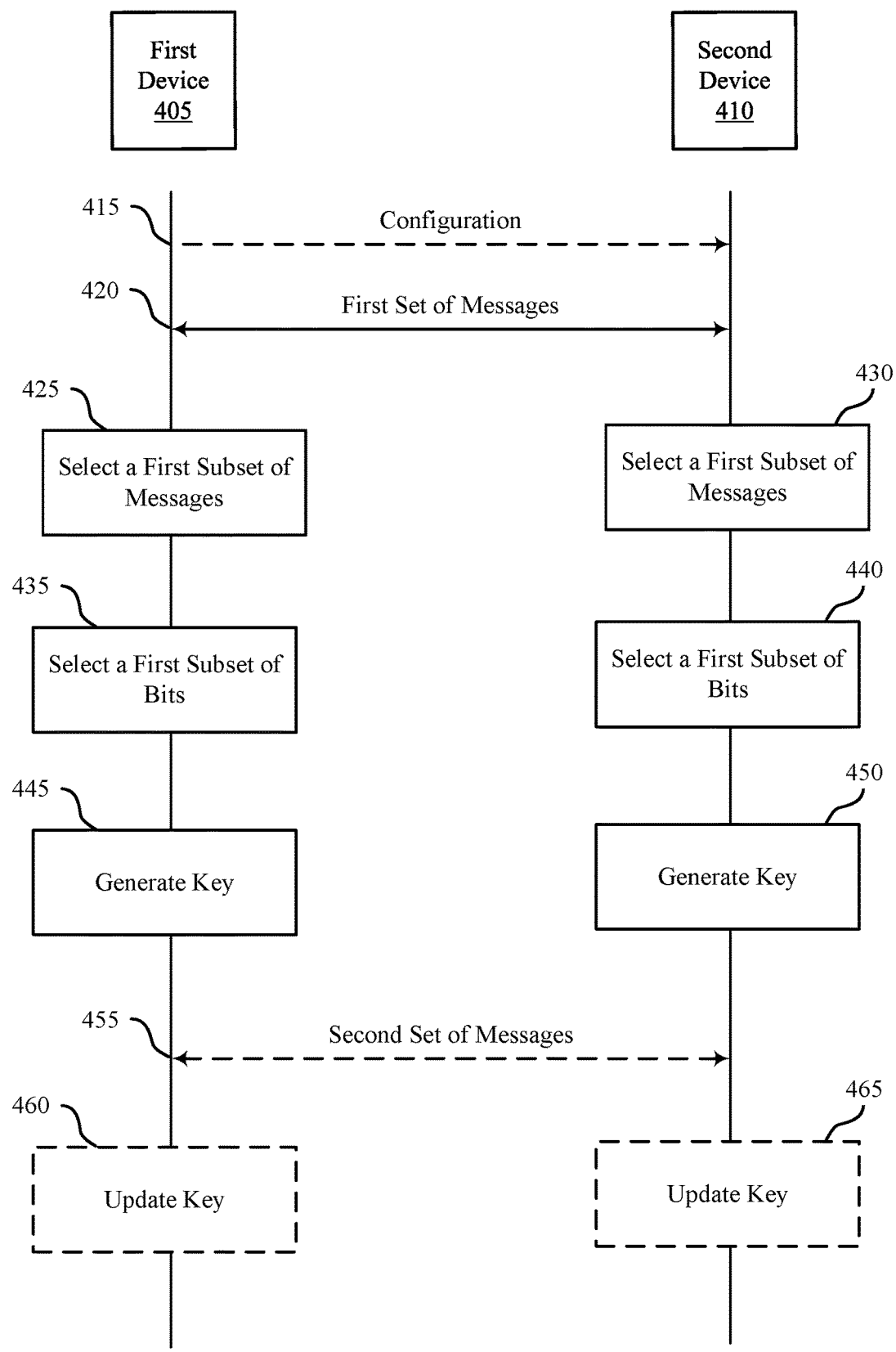
FIG. 4 illustrates an example of a process flow that supports a method for physical layer secured message scrambling in accordance with aspects of the present disclosure.

FIG. 4 illustrates an example of a process flow 400 that supports a method for physical layer secured message scrambling in accordance with aspects of the present disclosure. In some examples, the process flow 400 may implement aspects of wireless communications system 100 or 200 or scrambling scheme 300. The process flow 400 may include a first device 405 and a second device 410, which may be examples of wireless devices as described with reference to FIGS. 1-3. Generally, the process flow 400 may illustrate an example of key generation using communications between the first device 405 and the second device 410.

In some examples, at 415 the first device 405 may transmit a configuration to the second device 410. For example, the first device 405 may transmit control signaling indicating a sampling configuration to the second device 410 as described herein with reference to FIG. 2. At 420, the first device 405 and the second device 410 may communicate a first set of messages (e.g., downlink messages, uplink messages, sidelink messages, or any combination thereof). In some examples, the first set of messages may be messages that are acknowledged according to an acknowledgment procedure.

At 425, the first device 405 may select a first subset of messages. For example, the first device 405 may select a first subset of the first set of messages in accordance with a sampling configuration as described herein. Additionally or alternatively, at 430 the second device 410 may select the first subset of messages from the first set of messages in accordance with the sampling configuration.

At 435, the first device 405 may select a first subset of bits from each message of the first subset of message in accordance with a sampling configuration (e.g., the sampling configuration may indicate indices, configurations, or both for selecting the first subset of bits from each of the first subset of messages. At 440, the second device 410 may additionally or alternatively select the first subset of bits.

At 445, the first device 405 may generate a key using bit values of the first subset of bits from each message of the first subset of messages. For example, the first device 405 may append each bit value of the selected bits in a sequential order to generate the key, although other methods for key generation from the first subset of bits may be used. At 450, the second device 410 may generate the key.

In some examples, at 455 the first device 405 and the second device 410 may exchange a second set of messages. In some examples, other communications may be encoded or decoded using the generated key in addition or alternative to the second set of messages. That is, the first device 405 and the second device 410 may exchange communications encoded or decoded using the generated key. In some examples, the second set of messages may be included (e.g., a portion) in such communications. For example, the first device 405 and the second device 410 may encode or decode the second set of messages using the generated key. In some examples, at 460 and 465 the devices may update the key based on the second set of messages as described herein with reference to FIG. 2.

Figure 5:
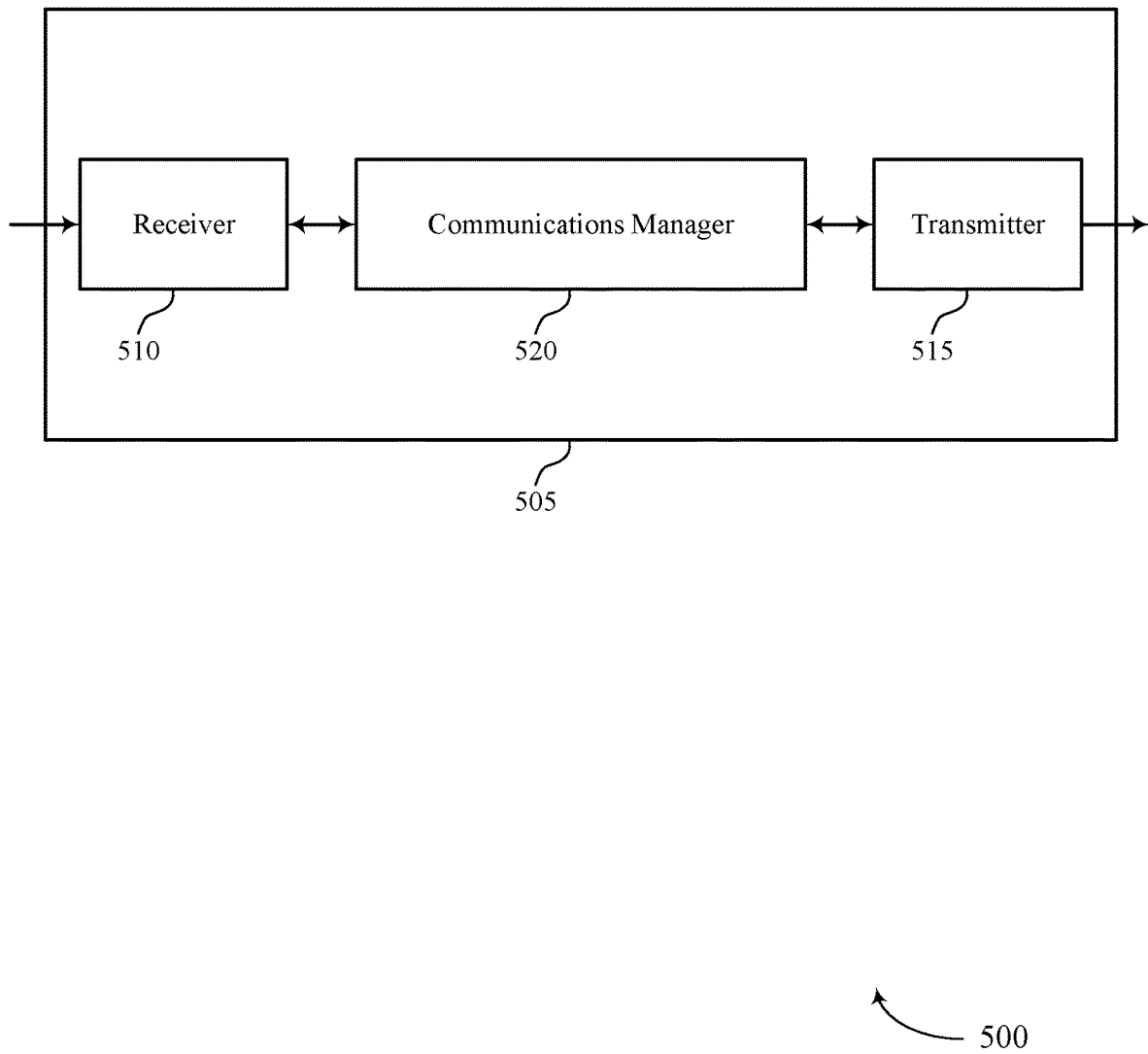
FIGS. 5 and 6 show block diagrams of devices that support a method for physical layer secured message scrambling in accordance with aspects of the present disclosure.

FIG. 5 shows a block diagram 500 of a device 505 that supports a method for physical layer secured message scrambling in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to a method for physical layer secured message scrambling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to a method for physical layer secured message scrambling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of a method for physical layer secured message scrambling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless device in accordance with examples as disclosed herein. For example, the communications manager 520 may be configured as or otherwise support a means for communicating, with a second wireless device, a first set of multiple messages of a first message type that are acknowledged according to an acknowledgement procedure. The communications manager 520 may be configured as or otherwise support a means for selecting, based on the first set of multiple messages being acknowledged and according to a sampling configuration common to both the first wireless device and the second wireless device, a first subset of messages of the first set of multiple messages and a first subset of bits from each message of the first subset of messages. The communications manager 520 may be configured as or otherwise support a means for generating a key using bit values of the first subset of bits from each message of the first subset of messages. The communications manager 520 may be configured as or otherwise support a means for encoding a message using the key. The communications manager 520 may be configured as or otherwise support a means for transmitting the encoded message to the second wireless device.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for secured message scrambling as described herein. For example, the device 505 may support key generation using historical information communicated between devices, which may result in improved security and efficient communications and power usage at the device 505, among other advantages.

Figure 6:
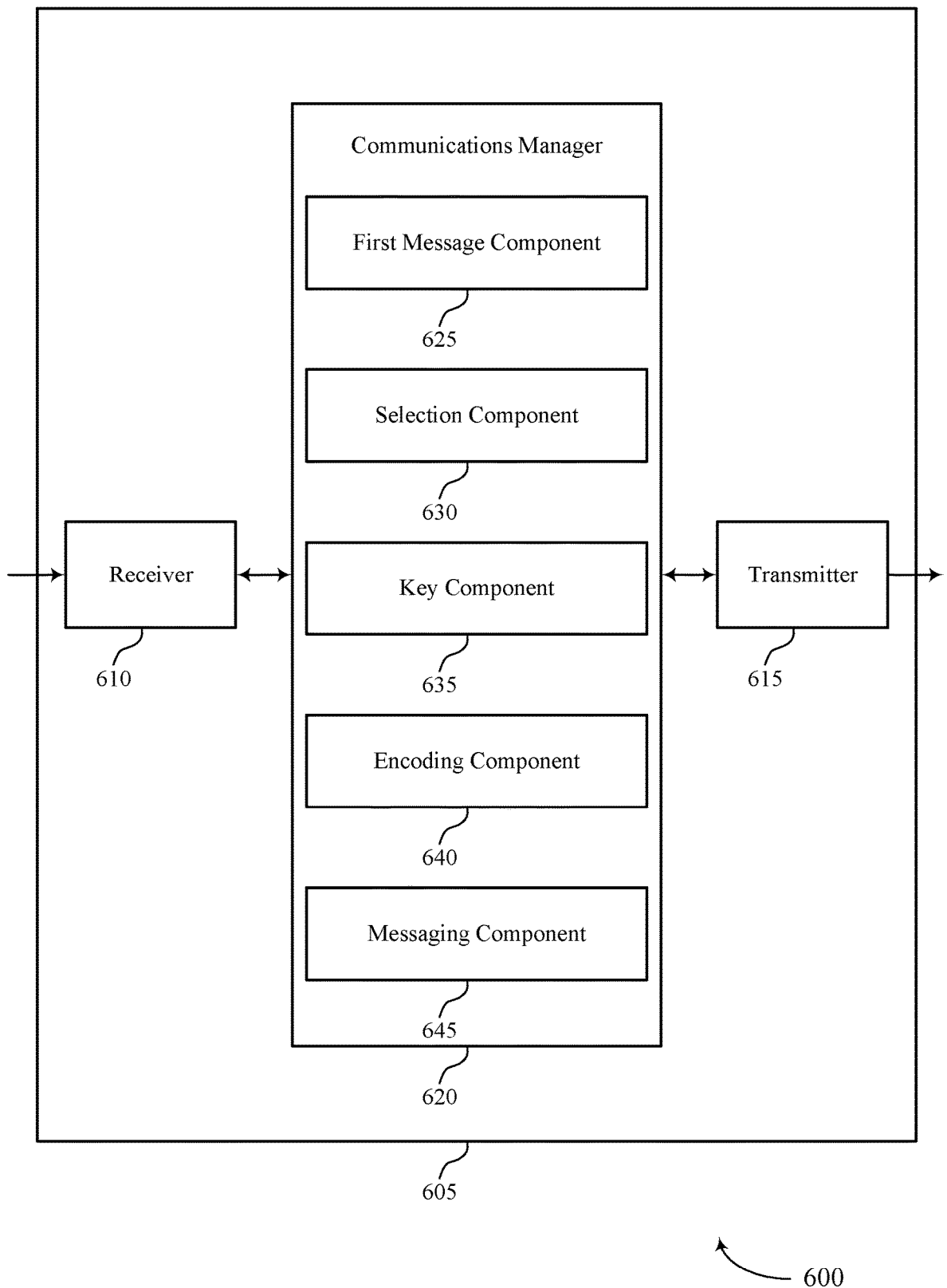

FIG. 6 shows a block diagram 600 of a device 605 that supports a method for physical layer secured message scrambling in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to a method for physical layer secured message scrambling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to a method for physical layer secured message scrambling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of a method for physical layer secured message scrambling as described herein. For example, the communications manager 620 may include a first message component 625, a selection component 630, a key component 635, an encoding component 640, a messaging component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless device in accordance with examples as disclosed herein. The first message component 625 may be configured as or otherwise support a means for communicating, with a second wireless device, a first set of multiple messages of a first message type that are acknowledged according to an acknowledgement procedure. The selection component 630 may be configured as or otherwise support a means for selecting, based on the first set of multiple messages being acknowledged and according to a sampling configuration common to both the first wireless device and the second wireless device, a first subset of messages of the first set of multiple messages and a first subset of bits from each message of the first subset of messages. The key component 635 may be configured as or otherwise support a means for generating a key using bit values of the first subset of bits from each message of the first subset of messages. The encoding component 640 may be configured as or otherwise support a means for encoding a message using the key. The messaging component 645 may be configured as or otherwise support a means for transmitting the encoded message to the second wireless device.

Figure 7:
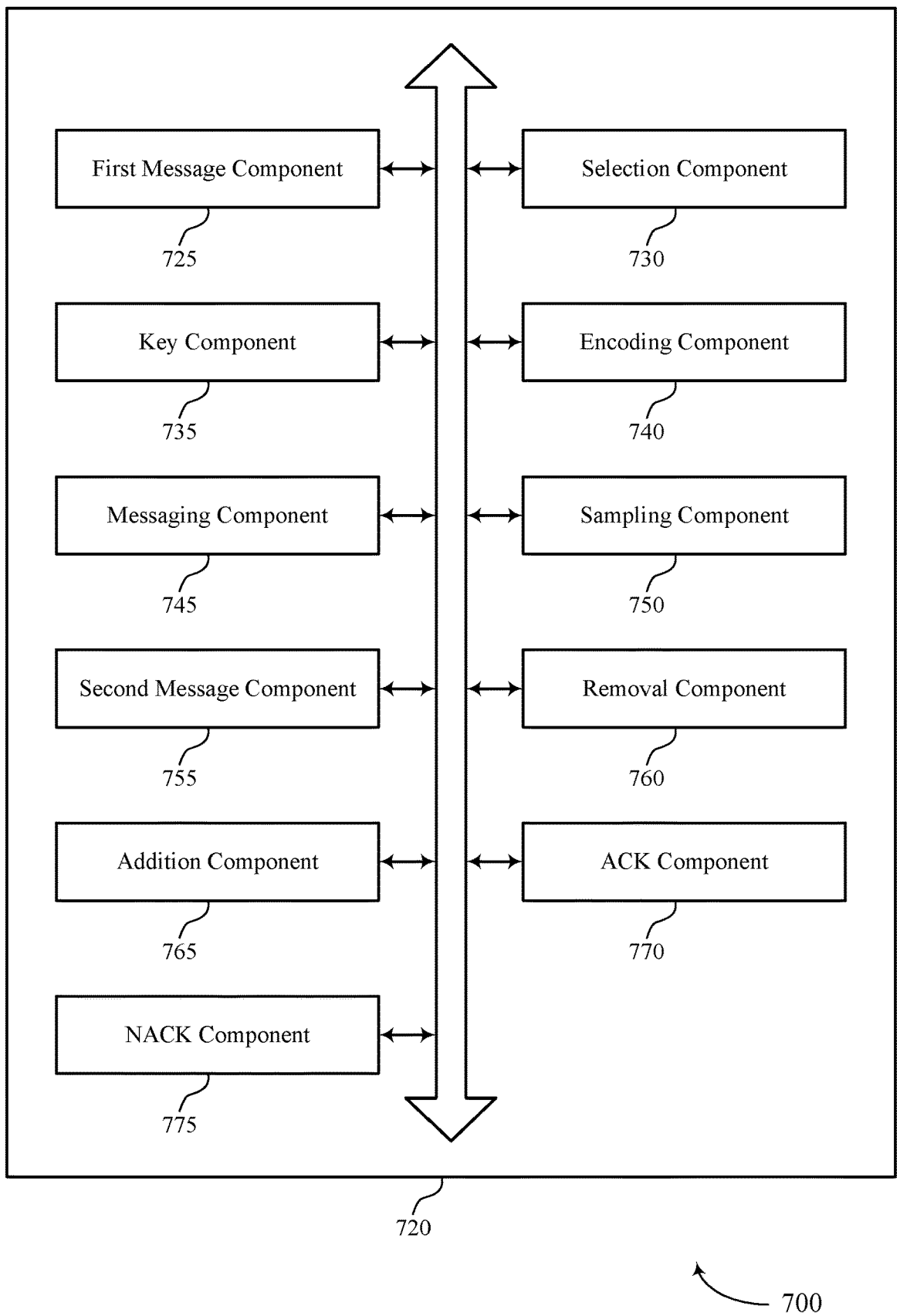
FIG. 7 shows a block diagram of a communications manager that supports a method for physical layer secured message scrambling in accordance with aspects of the present disclosure.

FIG. 7 shows a block diagram 700 of a communications manager 720 that supports a method for physical layer secured message scrambling in accordance with aspects of the present disclosure. The communications manager 720 may be an example of aspects of a communications manager 520, a communications manager 620, or both, as described herein. The communications manager 720, or various components thereof, may be an example of means for performing various aspects of a method for physical layer secured message scrambling as described herein. For example, the communications manager 720 may include a first message component 725, a selection component 730, a key component 735, an encoding component 740, a messaging component 745, a sampling component 750, a second message component 755, a removal component 760, an addition component 765, an ACK component 770, a NACK component 775, or any combination thereof. Each of these components may communicate, directly or indirectly, with one another (e.g., via one or more buses).

The communications manager 720 may support wireless communication at a first wireless device in accordance with examples as disclosed herein. The first message component 725 may be configured as or otherwise support a means for communicating, with a second wireless device, a first set of multiple messages of a first message type that are acknowledged according to an acknowledgement procedure. The selection component 730 may be configured as or otherwise support a means for selecting, based on the first set of multiple messages being acknowledged and according to a sampling configuration common to both the first wireless device and the second wireless device, a first subset of messages of the first set of multiple messages and a first subset of bits from each message of the first subset of messages. The key component 735 may be configured as or otherwise support a means for generating a key using bit values of the first subset of bits from each message of the first subset of messages. The encoding component 740 may be configured as or otherwise support a means for encoding a message using the key. The messaging component 745 may be configured as or otherwise support a means for transmitting the encoded message to the second wireless device.

In some examples, the sampling configuration includes a sampling frequency for a systematic sampling of the first set of multiple messages, one or more indices indicating bits to sample from selected messages of the first set of multiple messages, an indication of the first message type, or any combination thereof.

In some examples, the sampling component 750 may be configured as or otherwise support a means for receiving the sampling configuration from the second wireless device, where the first wireless device includes a first UE and the second wireless device includes a base station or a second UE. In some examples, the sampling component 750 may be configured as or otherwise support a means for transmitting the sampling configuration to the second wireless device, where the first wireless device includes the base station or the second UE and the second wireless device includes the first UE.

In some examples, the second message component 755 may be configured as or otherwise support a means for communicating, with the second wireless device, a second set of multiple messages of the first message type after the first set of multiple messages of the first message type are communicated. In some examples, the selection component 730 may be configured as or otherwise support a means for selecting, according to the sampling configuration, the first subset of bits from a message of the second set of multiple messages of the first message type. In some examples, the removal component 760 may be configured as or otherwise support a means for removing, from the key, the first subset of bits associated with a first message of the first subset of messages of the first set of multiple messages. In some examples, the addition component 765 may be configured as or otherwise support a means for adding, to the key, the first subset of bits from the message of the second set of multiple messages of the first message type.

In some examples, the second message component 755 may be configured as or otherwise support a means for communicating, with the second wireless device, a second set of multiple messages of the first message type after the first set of multiple messages of the first message type are communicated. In some examples, the selection component 730 may be configured as or otherwise support a means for selecting, according to the sampling configuration, a second subset of messages of the second set of multiple messages and a second subset of bits from each message of the second subset of messages. In some examples, the key component 735 may be configured as or otherwise support a means for generating an updated key using bit values of the second subset of bits from each message of the second subset of messages.

In some examples, the second message component 755 may be configured as or otherwise support a means for communicating, with the second wireless device, a second set of multiple messages of a second message type that are acknowledged according to the acknowledgement procedure. In some examples, the selection component 730 may be configured as or otherwise support a means for selecting, according to the sampling configuration, a second subset of messages of the second set of multiple messages and a second subset of bits from each message of the second subset of messages, where the key is generated both using the bit values of the first subset of bits from each message of the first subset of messages and using bit values of the second subset of bits from each message of the second subset of messages.

In some examples, communicating the first set of multiple messages includes receiving the first set of multiple messages from the second wireless device or transmitting the first set of multiple messages to the second wireless device. In some examples, communicating the second set of multiple messages includes receiving the second set of multiple messages from the second wireless device or transmitting the second set of multiple messages to the second wireless device.

In some examples, to support selecting the first subset of messages of the first set of multiple messages, the first message component 725 may be configured as or otherwise support a means for receiving, from the second wireless device, a first message of the first set of multiple messages and a second message of the first set of multiple messages. In some examples, to support selecting the first subset of messages of the first set of multiple messages, the ACK component 770 may be configured as or otherwise support a means for transmitting, to the second wireless device, a positive acknowledgement in response to a successful decoding of the first message and a negative acknowledgement in response to an unsuccessful decoding of the second message. In some examples, to support selecting the first subset of messages of the first set of multiple messages, the selection component 730 may be configured as or otherwise support a means for selecting the first message as one of the first subset of messages based on transmitting the positive acknowledgement for the first message. In some examples, to support selecting the first subset of messages of the first set of multiple messages, the NACK component 775 may be configured as or otherwise support a means for determining to exclude the second message as one of the first subset of messages based on transmitting the negative acknowledgement for the second message.

In some examples, to support selecting the first subset of messages of the first set of multiple messages, the first message component 725 may be configured as or otherwise support a means for transmitting, to the second wireless device, a first message of the first set of multiple messages and a second message of the first set of multiple messages. In some examples, to support selecting the first subset of messages of the first set of multiple messages, the ACK component 770 may be configured as or otherwise support a means for receiving, from the second wireless device, a positive acknowledgement in response to a successful decoding of the first message and a negative acknowledgement in response to an unsuccessful decoding of the second message. In some examples, to support selecting the first subset of messages of the first set of multiple messages, the selection component 730 may be configured as or otherwise support a means for selecting the first message as one of the first subset of messages based on transmitting the positive acknowledgement for the first message. In some examples, to support selecting the first subset of messages of the first set of multiple messages, the NACK component 775 may be configured as or otherwise support a means for determining to exclude the second message as one of the first subset of messages based on transmitting the negative acknowledgement for the second message.

In some examples, selecting the first subset of messages and the first subset of bits, and generating the key, and encoding the message using the key are performed at a physical layer of the first wireless device, the message received from a media access control layer before being encoded using the key. In some examples, the encoded message lacks security encoding performed at a layer of the first wireless device higher than the physical layer. In some examples, the first message type includes transport blocks, or channel state information reports, or a combination thereof. In some examples, the first message type includes unicast messages.

In some examples, the sampling configuration indicates a threshold duration of time over which the communicating of the first subset of messages is to occur, and the selecting of the first subset of messages of the first set of messages is based on the first subset of messages satisfying the threshold duration of time. In some examples, at least a first message of the first subset of messages is associated with a first location of the second wireless device, and at least a second message of the first subset of messages is associated with a second location of the second wireless device different than the first location. In some examples, the communicating of the first set of messages are associated with a first one or more locations of the second wireless device, and the second message component 755 may be configured as or otherwise support a means for communicating, with the second wireless device, a second set of messages that are associated with a second location of the second wireless device, the second location being different from the first one or more locations, and updating, based on the second wireless device communicating the second set of messages associated with the second location, the key using a subset of messages of the second set of messages according to the sampling configuration. In some examples, the communicating of the first set of messages are associated with a first location of the second wireless device, and the second message component 755 may be configured as or otherwise support a means for communicating, with the second wireless device, a second set of messages associated with the first location of the second wireless device, communicating a signal indicating to refrain from transmitting encrypted messages based on determining that the second set of messages are associated with a same location of the first wireless device as the first set of messages, and transmitting, to the second wireless device, a second message that is an unencrypted message based on determining that the second set of messages are associated with a same location of the first wireless device as the first set of messages.

Figure 8:
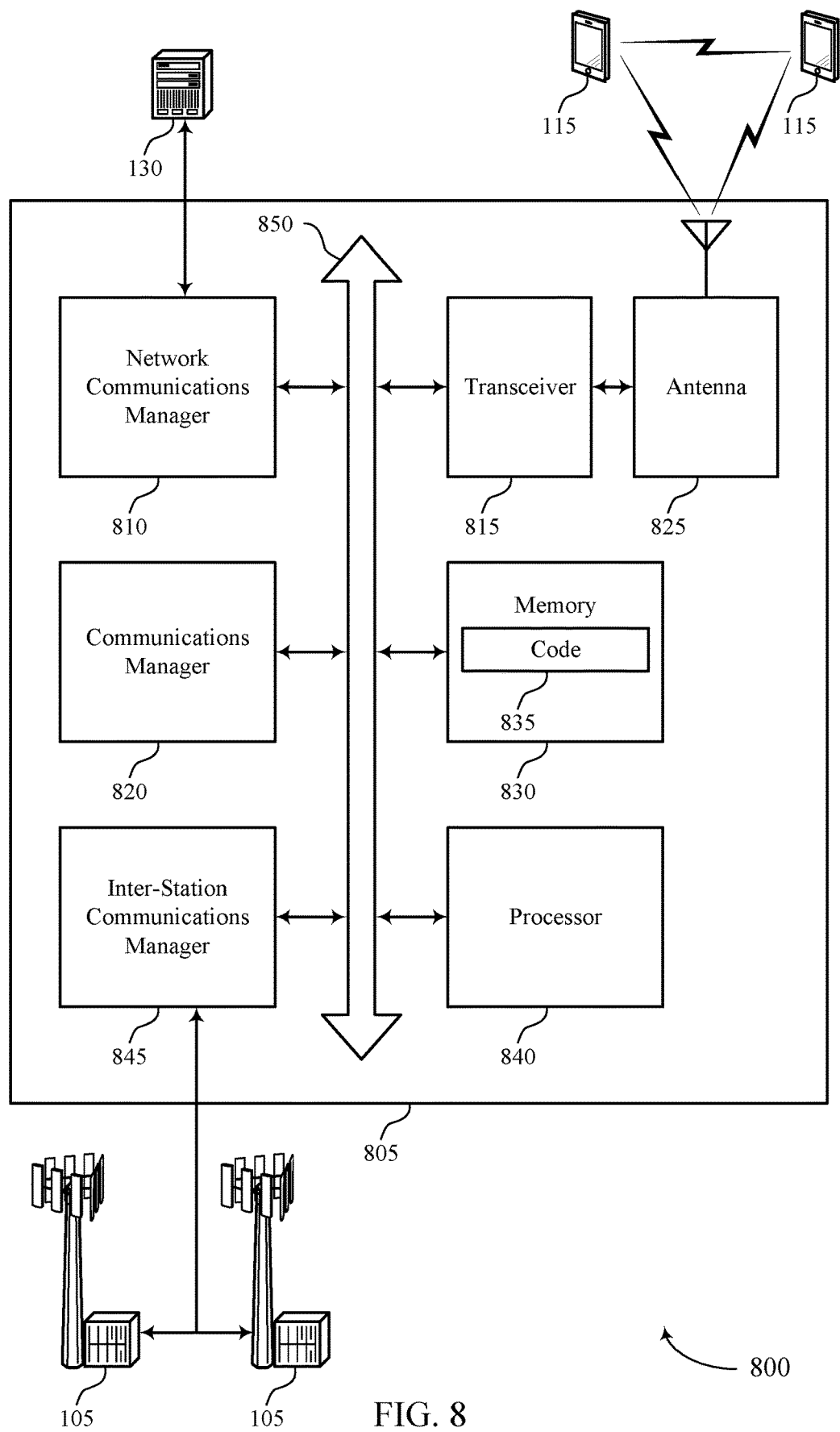
FIG. 8 shows a diagram of a system including a device that supports a method for physical layer secured message scrambling in accordance with aspects of the present disclosure.

FIG. 8 shows a diagram of a system 800 including a device 805 that supports a method for physical layer secured message scrambling in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting a method for physical layer secured message scrambling). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first wireless device in accordance with examples as disclosed herein. For example, the communications manager 820 may be configured as or otherwise support a means for communicating, with a second wireless device, a first set of multiple messages of a first message type that are acknowledged according to an acknowledgement procedure. The communications manager 820 may be configured as or otherwise support a means for selecting, based on the first set of multiple messages being acknowledged and according to a sampling configuration common to both the first wireless device and the second wireless device, a first subset of messages of the first set of multiple messages and a first subset of bits from each message of the first subset of messages. The communications manager 820 may be configured as or otherwise support a means for generating a key using bit values of the first subset of bits from each message of the first subset of messages. The communications manager 820 may be configured as or otherwise support a means for encoding a message using the key. The communications manager 820 may be configured as or otherwise support a means for transmitting the encoded message to the second wireless device.

By including or configuring the communications manager 820 in accordance with examples as described herein, the device 805 may support techniques for secured message scrambling as described herein. For example, the device 805 may support key generation using historical information communicated between devices, which may result in improved security and efficient communications and power usage at the device 805, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of a method for physical layer secured message scrambling as described herein, or the processor 840 and the memory 830 may be otherwise configured to perform or support such operations.

Figure 9:
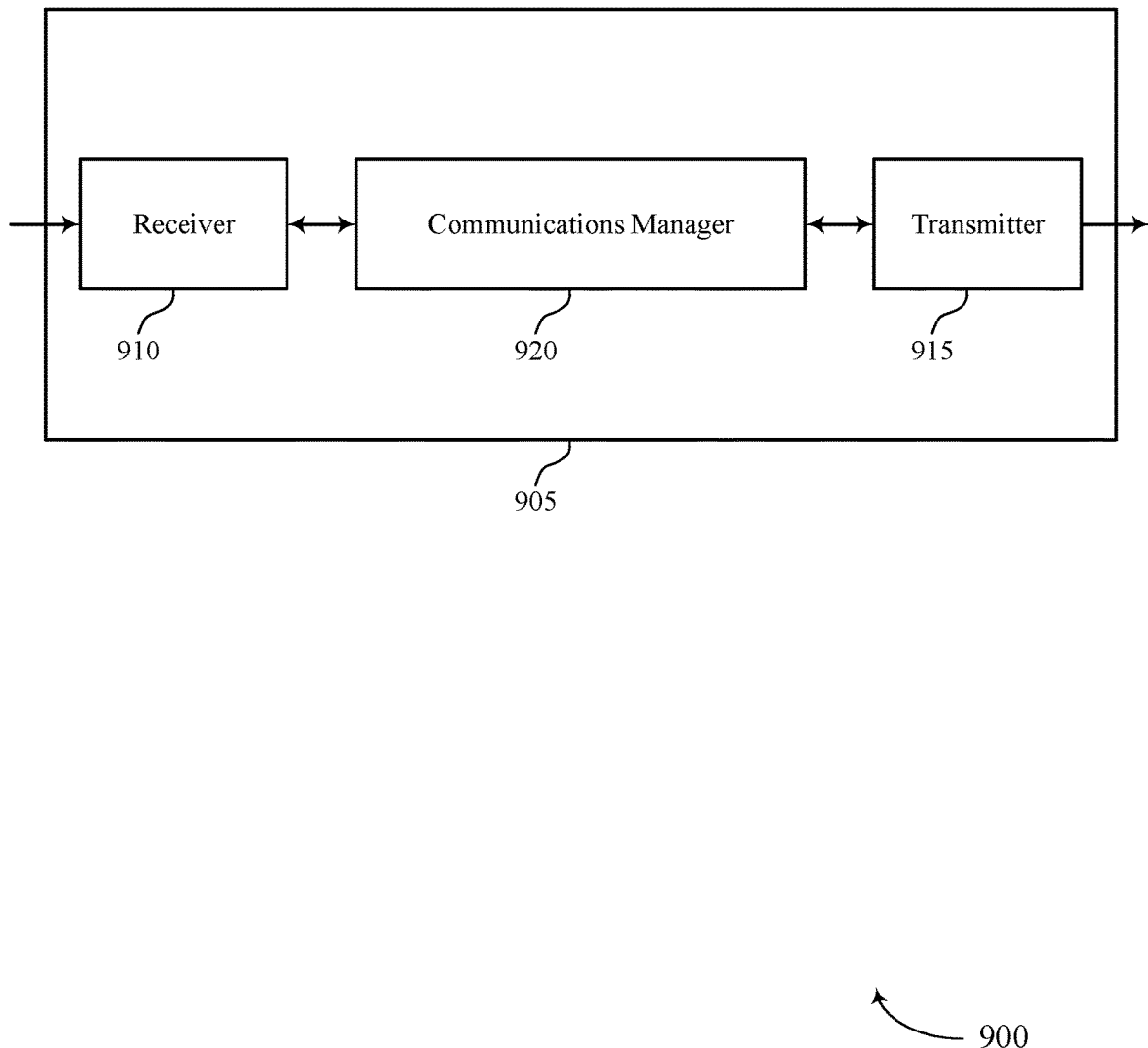
FIGS. 9 and 10 show block diagrams of devices that support a method for physical layer secured message scrambling in accordance with aspects of the present disclosure.

FIG. 9 shows a block diagram 900 of a device 905 that supports a method for physical layer secured message scrambling in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a method for physical layer secured message scrambling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a method for physical layer secured message scrambling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a method for physical layer secured message scrambling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first wireless device in accordance with examples as disclosed herein. For example, the communications manager 920 may be configured as or otherwise support a means for communicating, with a second wireless device, a first set of multiple messages of a first message type that are acknowledged according to an acknowledgement procedure. The communications manager 920 may be configured as or otherwise support a means for selecting, according to a sampling configuration common to both the first wireless device and the second wireless device, a first subset of messages of the first set of multiple messages and a first subset of bits from each message of the first subset of messages. The communications manager 920 may be configured as or otherwise support a means for generating a key using bit values of the first subset of bits from each message of the first subset of messages. The communications manager 920 may be configured as or otherwise support a means for receiving a message from the second wireless device. The communications manager 920 may be configured as or otherwise support a means for performing a decoding procedure on the message using the key.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for secured message scrambling as described herein. For example, the device 905 may support key generation using historical information communicated between devices, which may result in improved security and efficient communications and power usage at the device 905, among other advantages.

Figure 10:
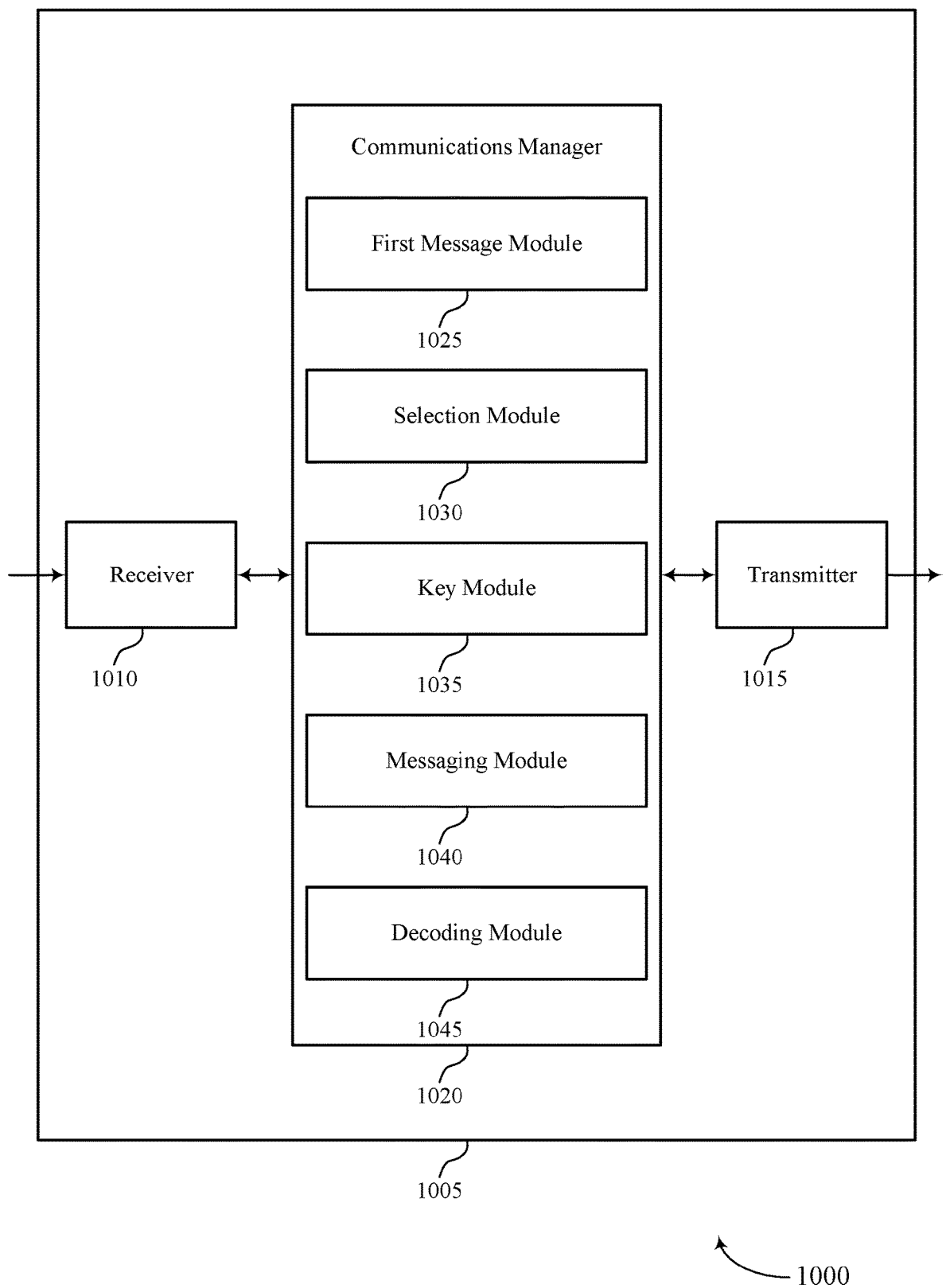

FIG. 10 shows a block diagram 1000 of a device 1005 that supports a method for physical layer secured message scrambling in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a method for physical layer secured message scrambling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a method for physical layer secured message scrambling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a method for physical layer secured message scrambling as described herein. For example, the communications manager 1020 may include a first message module 1025, a selection module 1030, a key module 1035, a messaging module 1040, a decoding module 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a first wireless device in accordance with examples as disclosed herein. The first message module 1025 may be configured as or otherwise support a means for communicating, with a second wireless device, a first set of multiple messages of a first message type that are acknowledged according to an acknowledgement procedure. The selection module 1030 may be configured as or otherwise support a means for selecting, according to a sampling configuration common to both the first wireless device and the second wireless device, a first subset of messages of the first set of multiple messages and a first subset of bits from each message of the first subset of messages. The key module 1035 may be configured as or otherwise support a means for generating a key using bit values of the first subset of bits from each message of the first subset of messages. The messaging module 1040 may be configured as or otherwise support a means for receiving a message from the second wireless device. The decoding module 1045 may be configured as or otherwise support a means for performing a decoding procedure on the message using the key.

Figure 11:
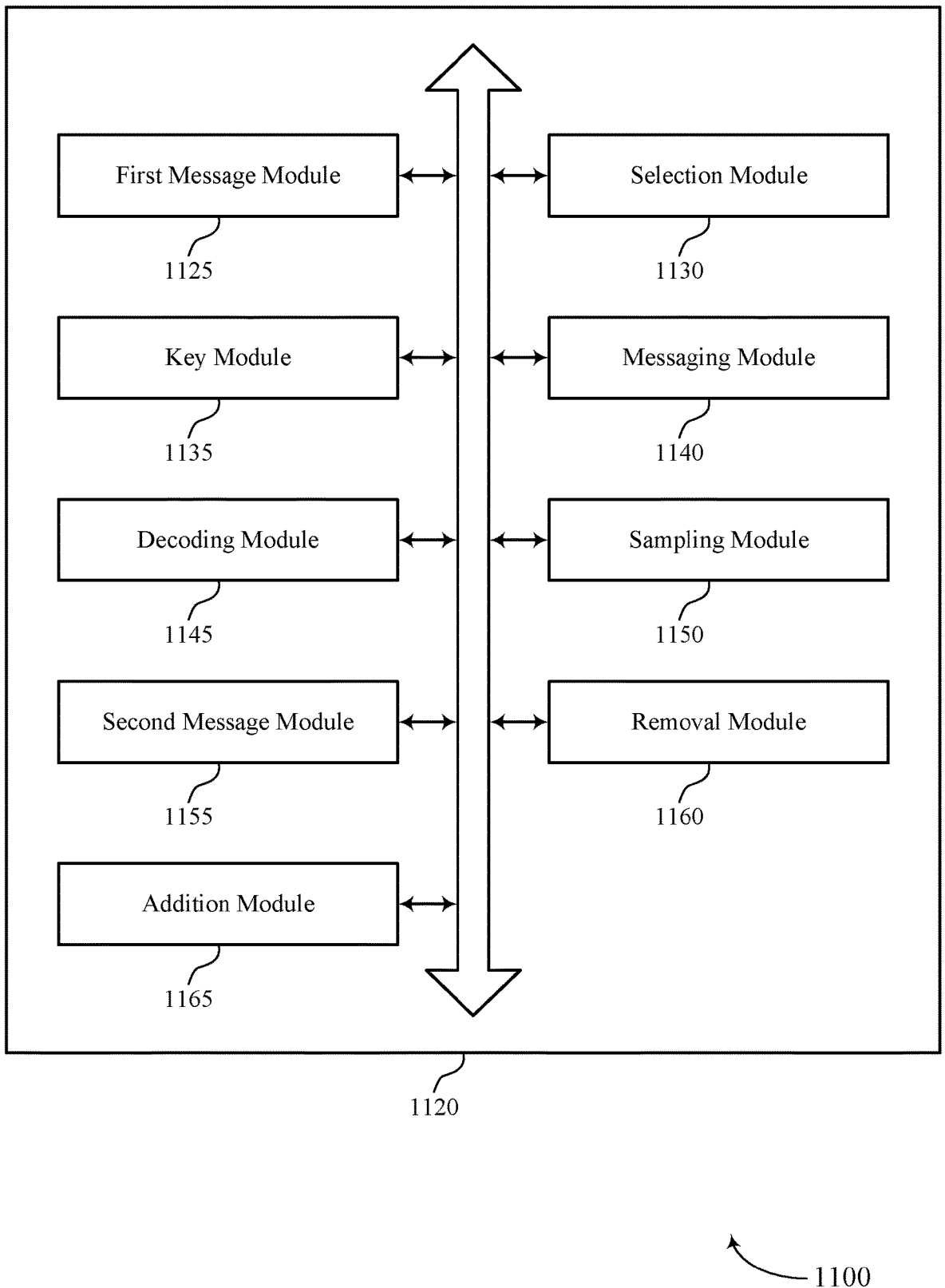
FIG. 11 shows a block diagram of a communications manager that supports a method for physical layer secured message scrambling in accordance with aspects of the present disclosure.

FIG. 11 shows a block diagram 1100 of a communications manager 1120 that supports a method for physical layer secured message scrambling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of a method for physical layer secured message scrambling as described herein. For example, the communications manager 1120 may include a first message module 1125, a selection module 1130, a key module 1135, a messaging module 1140, a decoding module 1145, a sampling module 1150, a second message module 1155, a removal module 1160, an addition module 1165, or any combination thereof. Each of these components may communicate, directly or indirectly, with one another (e.g., via one or more buses).

The communications manager 1120 may support wireless communication at a first wireless device in accordance with examples as disclosed herein. The first message module 1125 may be configured as or otherwise support a means for communicating, with a second wireless device, a first set of multiple messages of a first message type that are acknowledged according to an acknowledgement procedure. The selection module 1130 may be configured as or otherwise support a means for selecting, according to a sampling configuration common to both the first wireless device and the second wireless device, a first subset of messages of the first set of multiple messages and a first subset of bits from each message of the first subset of messages. The key module 1135 may be configured as or otherwise support a means for generating a key using bit values of the first subset of bits from each message of the first subset of messages. The messaging module 1140 may be configured as or otherwise support a means for receiving a message from the second wireless device. The decoding module 1145 may be configured as or otherwise support a means for performing a decoding procedure on the message using the key.

In some examples, the sampling module 1150 may be configured as or otherwise support a means for communicating the sampling configuration with the second wireless device, where the sampling configuration includes a sampling frequency for a systematic sampling of the first set of multiple messages, one or more indices indicating bits to sample from selected messages of the first set of multiple messages, an indication of the first message type, or any combination thereof.

In some examples, the sampling module 1150 may be configured as or otherwise support a means for receiving the sampling configuration from the second wireless device, where the first wireless device includes a first UE and the second wireless device includes a base station or a second UE. In some examples, the sampling module 1150 may be configured as or otherwise support a means for transmitting the sampling configuration to the second wireless device, where the first wireless device includes the base station or the second UE and the second wireless device includes the first UE.

In some examples, the second message module 1155 may be configured as or otherwise support a means for communicating, with the second wireless device, a second set of multiple messages of the first message type after the first set of multiple messages of the first message type are communicated. In some examples, the selection module 1130 may be configured as or otherwise support a means for selecting, according to the sampling configuration, the first subset of bits from a message of the second set of multiple messages of the first message type. In some examples, the removal module 1160 may be configured as or otherwise support a means for removing, from the key, the first subset of bits associated with a first message of the first subset of messages of the first set of multiple messages. In some examples, the addition module 1165 may be configured as or otherwise support a means for adding, to the key, the first subset of bits from the message of the second set of multiple messages of the first message type.

In some examples, the second message module 1155 may be configured as or otherwise support a means for communicating, with the second wireless device, a second set of multiple messages of the first message type after the first set of multiple messages of the first message type are communicated. In some examples, the selection module 1130 may be configured as or otherwise support a means for selecting, according to the sampling configuration, a second subset of messages of the second set of multiple messages and a second subset of bits from each message of the second subset of messages. In some examples, the key module 1135 may be configured as or otherwise support a means for generating an updated key using bit values of the second subset of bits from each message of the second subset of messages.

In some examples, the second message module 1155 may be configured as or otherwise support a means for communicating, with the second wireless device, a second set of multiple messages of a second message type that are acknowledged according to the acknowledgement procedure. In some examples, the selection module 1130 may be configured as or otherwise support a means for selecting, according to the sampling configuration, a second subset of messages of the second set of multiple messages and a second subset of bits from each message of the second subset of messages, where the key is generated both using the bit values of the first subset of bits from each message of the first subset of messages and using bit values of the second subset of bits from each message of the second subset of messages.

In some examples, the first message type includes transport blocks, or channel state information reports, or a combination thereof.

Figure 12:
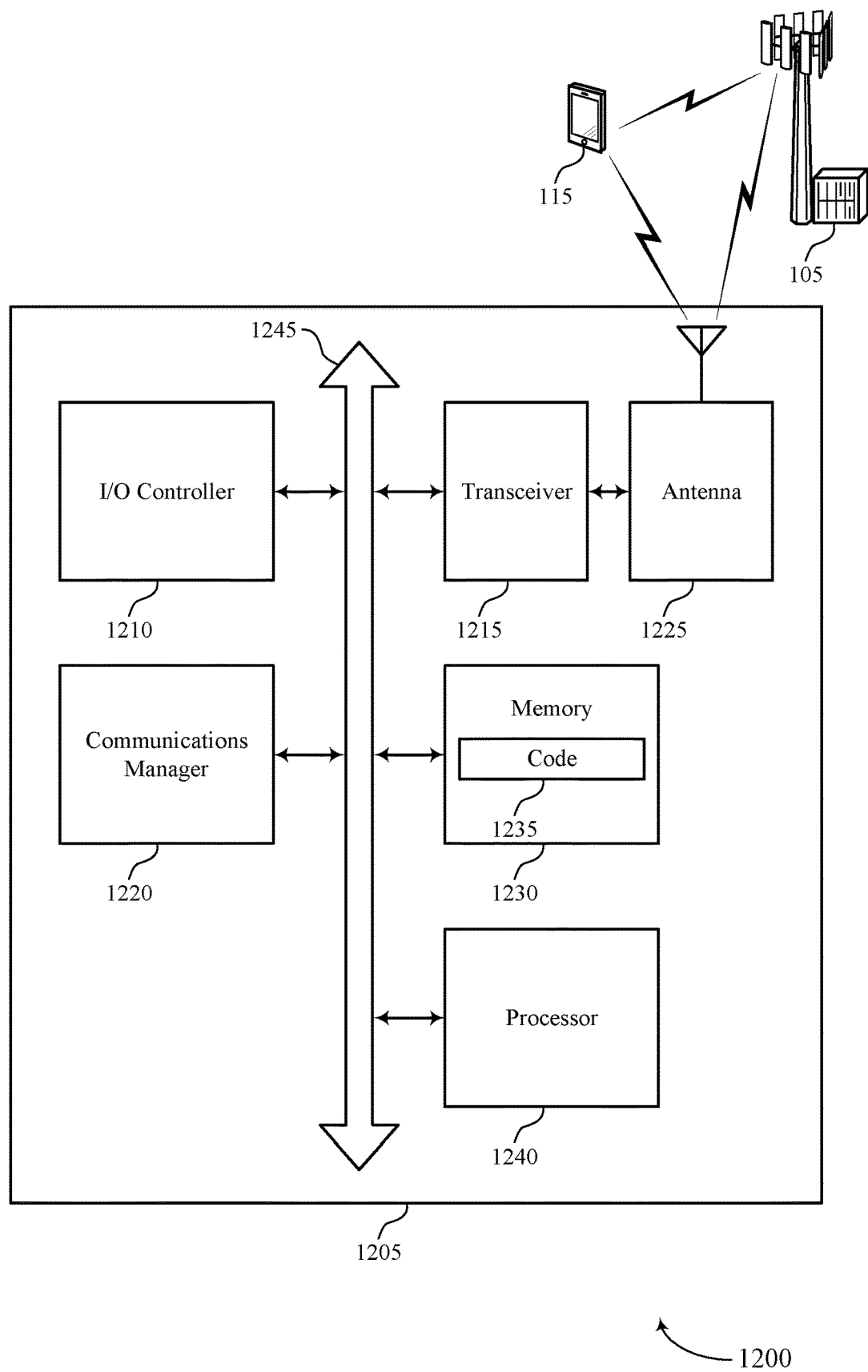
FIG. 12 shows a diagram of a system including a device that supports a method for physical layer secured message scrambling in accordance with aspects of the present disclosure.

FIG. 12 shows a diagram of a system 1200 including a device 1205 that supports a method for physical layer secured message scrambling in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting a method for physical layer secured message scrambling). For example, the device 1205 or a component of the device 1205 may include a processor 1240 and memory 1230 coupled to the processor 1240, the processor 1240 and memory 1230 configured to perform various functions described herein.

The communications manager 1220 may support wireless communication at a first wireless device in accordance with examples as disclosed herein. For example, the communications manager 1220 may be configured as or otherwise support a means for communicating, with a second wireless device, a first set of multiple messages of a first message type that are acknowledged according to an acknowledgement procedure. The communications manager 1220 may be configured as or otherwise support a means for selecting, according to a sampling configuration common to both the first wireless device and the second wireless device, a first subset of messages of the first set of multiple messages and a first subset of bits from each message of the first subset of messages. The communications manager 1220 may be configured as or otherwise support a means for generating a key using bit values of the first subset of bits from each message of the first subset of messages. The communications manager 1220 may be configured as or otherwise support a means for receiving a message from the second wireless device. The communications manager 1220 may be configured as or otherwise support a means for performing a decoding procedure on the message using the key.

By including or configuring the communications manager 1220 in accordance with examples as described herein, the device 1205 may support techniques for secured message scrambling as described herein. For example, the device 1205 may support key generation using historical information communicated between devices, which may result in improved security and efficient communications and power usage at the device 1205, among other advantages.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of a method for physical layer secured message scrambling as described herein, or the processor 1240 and the memory 1230 may be otherwise configured to perform or support such operations.

Figure 13:
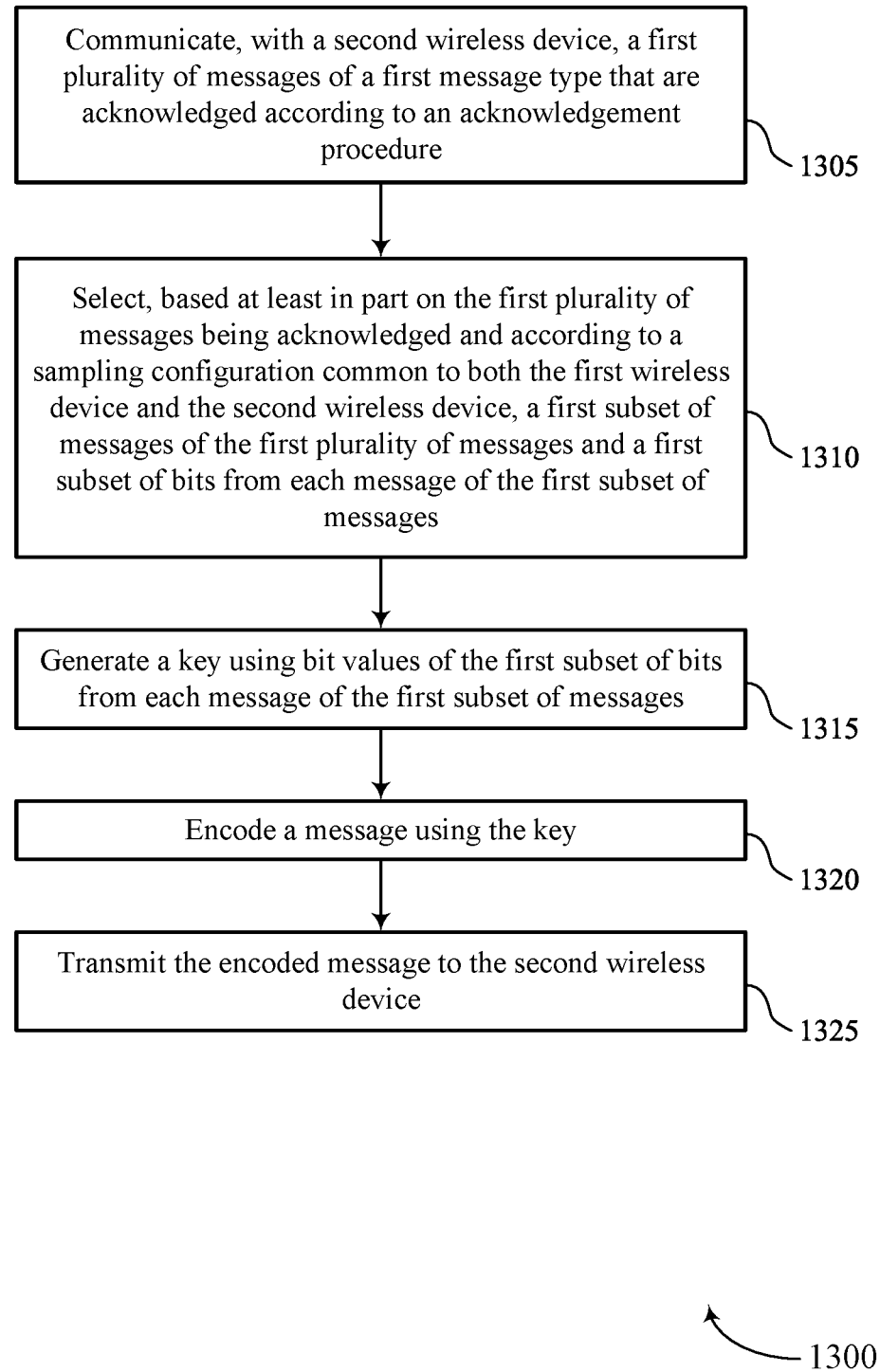
FIGS. 13 through 15 show flowcharts illustrating methods that support a method for physical layer secured message scrambling in accordance with aspects of the present disclosure.

FIG. 13 shows a flowchart illustrating a method 1300 that supports a method for physical layer secured message scrambling in accordance with aspects of the present disclosure. The operations of the method 1300 may be implemented by a base station or its components as described herein. For example, the operations of the method 1300 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include communicating, with a second wireless device, a first set of multiple messages of a first message type that are acknowledged according to an acknowledgement procedure. The operations of 1305 may be performed in accordance with examples as disclosed herein. In some examples, aspects of the operations of 1305 may be performed by a first message component 725 as described with reference to FIG. 7.

At 1310, the method may include selecting, based on the first set of multiple messages being acknowledged and according to a sampling configuration common to both the first wireless device and the second wireless device, a first subset of messages of the first set of multiple messages and a first subset of bits from each message of the first subset of messages. The operations of 1310 may be performed in accordance with examples as disclosed herein. In some examples, aspects of the operations of 1310 may be performed by a selection component 730 as described with reference to FIG. 7.

At 1315, the method may include generating a key using bit values of the first subset of bits from each message of the first subset of messages. The operations of 1315 may be performed in accordance with examples as disclosed herein. In some examples, aspects of the operations of 1315 may be performed by a key component 735 as described with reference to FIG. 7.

At 1320, the method may include encoding a message using the key. The operations of 1320 may be performed in accordance with examples as disclosed herein. In some examples, aspects of the operations of 1320 may be performed by an encoding component 740 as described with reference to FIG. 7.

At 1325, the method may include transmitting the encoded message to the second wireless device. The operations of 1325 may be performed in accordance with examples as disclosed herein. In some examples, aspects of the operations of 1325 may be performed by a messaging component 745 as described with reference to FIG. 7.

Figure 14:
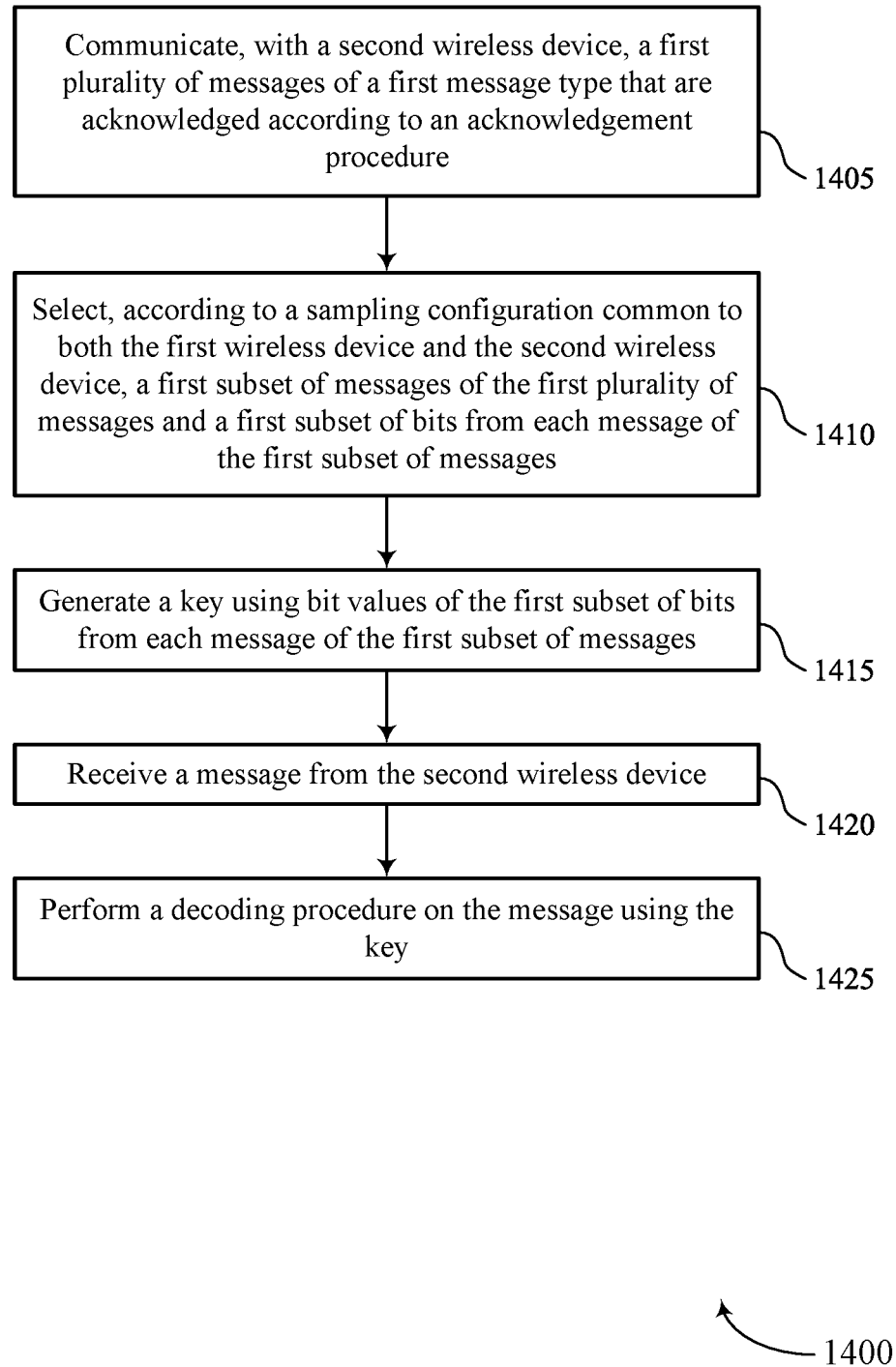

FIG. 14 shows a flowchart illustrating a method 1400 that supports a method for physical layer secured message scrambling in accordance with aspects of the present disclosure. The operations of the method 1400 may be implemented by a UE or its components as described herein. For example, the operations of the method 1400 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1405, the method may include communicating, with a second wireless device, a first set of multiple messages of a first message type that are acknowledged according to an acknowledgement procedure. The operations of 1405 may be performed in accordance with examples as disclosed herein. In some examples, aspects of the operations of 1405 may be performed by a first message module 1125 as described with reference to FIG. 11.

At 1410, the method may include selecting, according to a sampling configuration common to both the first wireless device and the second wireless device, a first subset of messages of the first set of multiple messages and a first subset of bits from each message of the first subset of messages. The operations of 1410 may be performed in accordance with examples as disclosed herein. In some examples, aspects of the operations of 1410 may be performed by a selection module 1130 as described with reference to FIG. 11.

At 1415, the method may include generating a key using bit values of the first subset of bits from each message of the first subset of messages. The operations of 1415 may be performed in accordance with examples as disclosed herein. In some examples, aspects of the operations of 1415 may be performed by a key module 1135 as described with reference to FIG. 11.

At 1420, the method may include receiving a message from the second wireless device. The operations of 1420 may be performed in accordance with examples as disclosed herein. In some examples, aspects of the operations of 1420 may be performed by a messaging module 1140 as described with reference to FIG. 11.

At 1425, the method may include performing a decoding procedure on the message using the key. The operations of 1425 may be performed in accordance with examples as disclosed herein. In some examples, aspects of the operations of 1425 may be performed by a decoding module 1145 as described with reference to FIG. 11.

Figure 15:
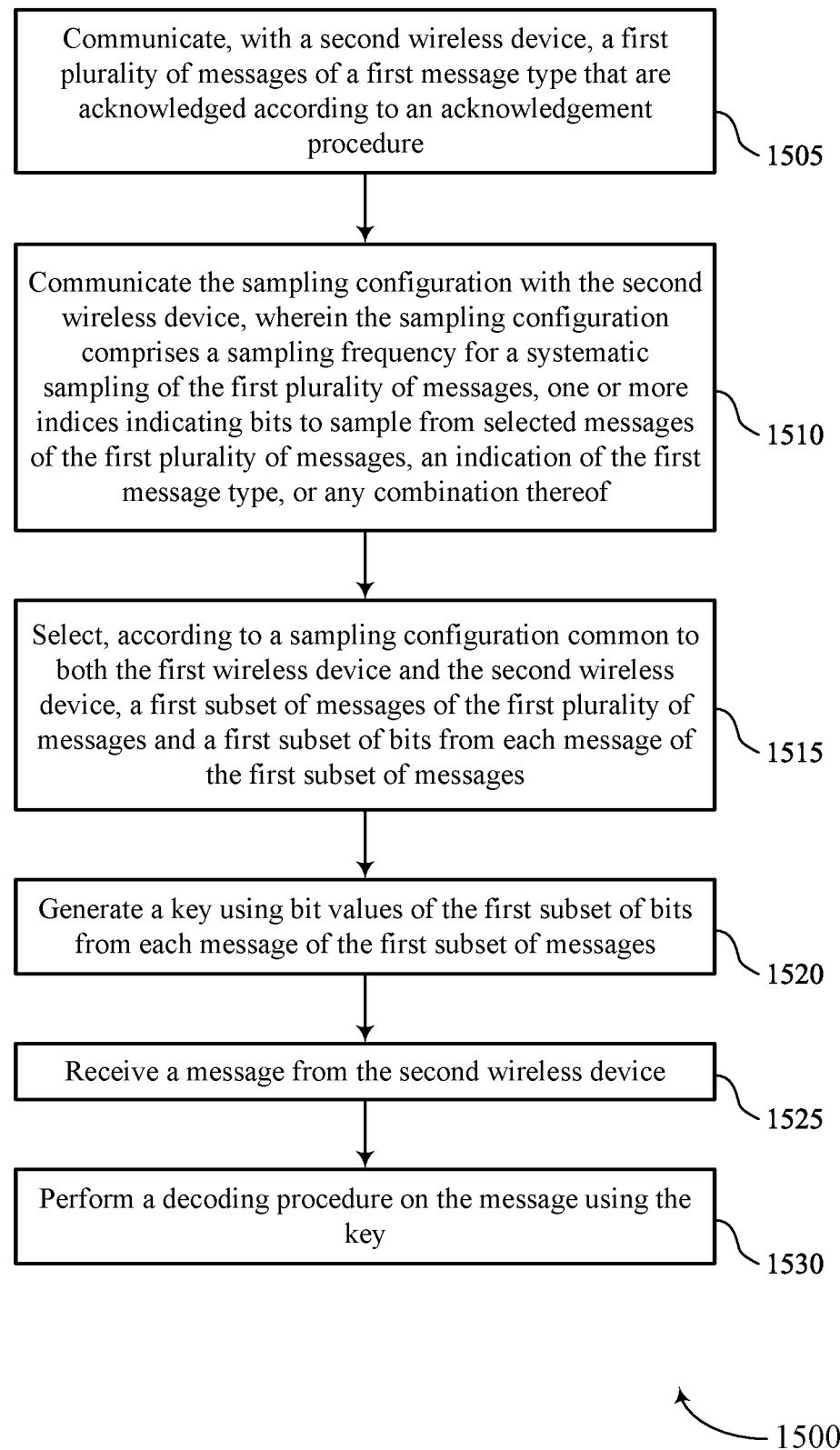

FIG. 15 shows a flowchart illustrating a method 1500 that supports a method for physical layer secured message scrambling in accordance with aspects of the present disclosure. The operations of the method 1500 may be implemented by a UE or its components as described herein. For example, the operations of the method 1500 may be performed by a UE 115 as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1505, the method may include communicating, with a second wireless device, a first set of multiple messages of a first message type that are acknowledged according to an acknowledgement procedure. The operations of 1505 may be performed in accordance with examples as disclosed herein. In some examples, aspects of the operations of 1505 may be performed by a first message module 1125 as described with reference to FIG. 11.

At 1510, the method may include communicating the sampling configuration with the second wireless device, where the sampling configuration includes a sampling frequency for a systematic sampling of the first set of multiple messages, one or more indices indicating bits to sample from selected messages of the first set of multiple messages, an indication of the first message type, or any combination thereof. The operations of 1510 may be performed in accordance with examples as disclosed herein. In some examples, aspects of the operations of 1510 may be performed by a sampling module 1150 as described with reference to FIG. 11.

At 1515, the method may include selecting, according to a sampling configuration common to both the first wireless device and the second wireless device, a first subset of messages of the first set of multiple messages and a first subset of bits from each message of the first subset of messages. The operations of 1515 may be performed in accordance with examples as disclosed herein. In some examples, aspects of the operations of 1515 may be performed by a selection module 1130 as described with reference to FIG. 11.

At 1520, the method may include generating a key using bit values of the first subset of bits from each message of the first subset of messages. The operations of 1520 may be performed in accordance with examples as disclosed herein. In some examples, aspects of the operations of 1520 may be performed by a key module 1135 as described with reference to FIG. 11.

At 1525, the method may include receiving a message from the second wireless device. The operations of 1525 may be performed in accordance with examples as disclosed herein. In some examples, aspects of the operations of 1525 may be performed by a messaging module 1140 as described with reference to FIG. 11.

At 1530, the method may include performing a decoding procedure on the message using the key. The operations of 1530 may be performed in accordance with examples as disclosed herein. In some examples, aspects of the operations of 1530 may be performed by a decoding module 1145 as described with reference to FIG. 11.

The following provides an overview of aspects of the present disclosure:

Aspect 1: A method for wireless communication at a first wireless device, comprising: communicating, with a second wireless device, a first plurality of messages of a first message type that are acknowledged according to an acknowledgement procedure; selecting, based at least in part on the first plurality of messages being acknowledged and according to a sampling configuration common to both the first wireless device and the second wireless device, a first subset of messages of the first plurality of messages and a first subset of bits from each message of the first subset of messages; generating a key using bit values of the first subset of bits from each message of the first subset of messages; encoding a message using the key; and transmitting the encoded message to the second wireless device.

Aspect 2: The method of aspect 1, wherein the sampling configuration comprises a sampling frequency for a systematic sampling of the first plurality of messages, one or more indices indicating bits to sample from selected messages of the first plurality of messages, an indication of the first message type, or any combination thereof.

Aspect 3: The method of any of aspects 1 through 2, further comprising: receiving the sampling configuration from the second wireless device, wherein the first wireless device comprises a first UE and the second wireless device comprises a base station or a second UE; or transmitting the sampling configuration to the second wireless device, wherein the first wireless device comprises the base station or the second UE and the second wireless device comprises the first UE.

Aspect 4: The method of any of aspects 1 through 3, further comprising: communicating, with the second wireless device, a second plurality of messages of the first message type after the first plurality of messages of the first message type are communicated; selecting, according to the sampling configuration, the first subset of bits from a message of the second plurality of messages of the first message type; removing, from the key, the first subset of bits associated with a first message of the first subset of messages of the first plurality of messages; and adding, to the key, the first subset of bits from the message of the second plurality of messages of the first message type.

Aspect 5: The method of any of aspects 1 through 4, further comprising: communicating, with the second wireless device, a second plurality of messages of the first message type after the first plurality of messages of the first message type are communicated; selecting, according to the sampling configuration, a second subset of messages of the second plurality of messages and a second subset of bits from each message of the second subset of messages; and generating an updated key using bit values of the second subset of bits from each message of the second subset of messages.

Aspect 6: The method of any of aspects 1 through 5, further comprising: communicating, with the second wireless device, a second plurality of messages of a second message type that are acknowledged according to the acknowledgement procedure; and selecting, according to the sampling configuration, a second subset of messages of the second plurality of messages and a second subset of bits from each message of the second subset of messages, wherein the key is generated both using the bit values of the first subset of bits from each message of the first subset of messages and using bit values of the second subset of bits from each message of the second subset of messages.

Aspect 7: The method of aspect 6, wherein communicating the first plurality of messages comprises receiving the first plurality of messages from the second wireless device or transmitting the first plurality of messages to the second wireless device; and communicating the second plurality of messages comprises receiving the second plurality of messages from the second wireless device or transmitting the second plurality of messages to the second wireless device.

Aspect 8: The method of any of aspects 1 through 7, wherein selecting the first subset of messages of the first plurality of messages comprises: receiving, from the second wireless device, a first message of the first plurality of messages and a second message of the first plurality of messages; transmitting, to the second wireless device, a positive acknowledgement in response to a successful decoding of the first message and a negative acknowledgement in response to an unsuccessful decoding of the second message; selecting the first message as one of the first subset of messages based at least in part on transmitting the positive acknowledgement for the first message; and determining to exclude the second message as one of the first subset of messages based at least in part on transmitting the negative acknowledgement for the second message.

Aspect 9: The method of any of aspects 1 through 8, wherein selecting the first subset of messages of the first plurality of messages comprises: transmitting, to the second wireless device, a first message of the first plurality of messages and a second message of the first plurality of messages; receiving, from the second wireless device, a positive acknowledgement in response to a successful decoding of the first message and a negative acknowledgement in response to an unsuccessful decoding of the second message; selecting the first message as one of the first subset of messages based at least in part on transmitting the positive acknowledgement for the first message; and determining to exclude the second message as one of the first subset of messages based at least in part on transmitting the negative acknowledgement for the second message.

Aspect 10: The method of any of aspects 1 through 9, wherein selecting the first subset of messages and the first subset of bits, and generating the key, and encoding the message using the key are performed at a physical layer of the first wireless device, the message received from a media access control layer before being encoded using the key.

Aspect 11: The method of aspect 10, wherein the encoded message lacks security encoding performed at a layer of the first wireless device higher than the physical layer.

Aspect 12: The method of any of aspects 1 through 11, wherein the first message type comprises transport blocks, or channel state information reports, or a combination thereof.

Aspect 13: The method of any of aspects 1 through 12, wherein the first message type comprises unicast messages.

Aspect 14: The method of any of aspects 1 through 13, wherein the sampling configuration indicates a threshold duration of time over which the communicating of the first subset of messages is to occur, and the selecting of the first subset of messages of the first plurality of messages is based at least in part on the first subset of messages satisfying the threshold duration of time.

Aspect 15: The method of any of aspects 1 through 14, wherein at least a first message of the first subset of messages is associated with a first location of the second wireless device, and at least a second message of the first subset of messages is associated with a second location of the second wireless device different than the first location.

Aspect 16: The method of any of aspects 1 through 15, wherein the communicating of the first plurality of messages are associated with a first one or more locations of the second wireless device, the method further comprising: communicating, with the second wireless device, a second plurality of messages that are associated with a second location of the second wireless device, the second location being different from the first one or more locations; and updating, based at least in part on the second wireless device communicating the second plurality of messages associated with the second location, the key using a subset of messages of the second plurality of messages according to the sampling configuration, wherein a first set of bits of the key are associated with a first location of the first one or more locations and a second set of bits of the key are associated with the second location.

Aspect 17: The method of any of aspects 1 through 16, wherein the communicating of the first plurality of messages are associated with a first location of the second wireless device, the method further comprising: communicating, with the second wireless device, a second plurality of messages associated with the first location of the second wireless device; communicating a signal indicating to refrain from transmitting encrypted messages based at least in part on determining that the second plurality of messages are associated with a same location of the first wireless device as the first plurality of messages; and transmitting, to the second wireless device, a second message that is an unencrypted message based at least in part on determining that the second plurality of messages are associated with a same location of the first wireless device as the first plurality of messages.

Aspect 18: A method for wireless communication at a first wireless device, comprising: communicating, with a second wireless device, a first plurality of messages of a first message type that are acknowledged according to an acknowledgement procedure; selecting, according to a sampling configuration common to both the first wireless device and the second wireless device, a first subset of messages of the first plurality of messages and a first subset of bits from each message of the first subset of messages; generating a key using bit values of the first subset of bits from each message of the first subset of messages; receiving a message from the second wireless device; and performing a decoding procedure on the message using the key.

Aspect 19: The method of aspect 18, further comprising: communicating the sampling configuration with the second wireless device, wherein the sampling configuration comprises a sampling frequency for a systematic sampling of the first plurality of messages, one or more indices indicating bits to sample from selected messages of the first plurality of messages, an indication of the first message type, or any combination thereof.

Aspect 20: The method of any of aspects 18 through 19, further comprising: receiving the sampling configuration from the second wireless device, wherein the first wireless device comprises a first UE and the second wireless device comprises a base station or a second UE; or transmitting the sampling configuration to the second wireless device, wherein the first wireless device comprises the base station or the second UE and the second wireless device comprises the first UE.

Aspect 21: The method of any of aspects 18 through 20, further comprising: communicating, with the second wireless device, a second plurality of messages of the first message type after the first plurality of messages of the first message type are communicated; selecting, according to the sampling configuration, the first subset of bits from a message of the second plurality of messages of the first message type; removing, from the key, the first subset of bits associated with a first message of the first subset of messages of the first plurality of messages; and adding, to the key, the first subset of bits from the message of the second plurality of messages of the first message type.

Aspect 22: The method of any of aspects 18 through 21, further comprising: communicating, with the second wireless device, a second plurality of messages of the first message type after the first plurality of messages of the first message type are communicated; selecting, according to the sampling configuration, a second subset of messages of the second plurality of messages and a second subset of bits from each message of the second subset of messages; and generating an updated key using bit values of the second subset of bits from each message of the second subset of messages.

Aspect 23: The method of any of aspects 18 through 22, further comprising: communicating, with the second wireless device, a second plurality of messages of a second message type that are acknowledged according to the acknowledgement procedure; and selecting, according to the sampling configuration, a second subset of messages of the second plurality of messages and a second subset of bits from each message of the second subset of messages, wherein the key is generated both using the bit values of the first subset of bits from each message of the first subset of messages and using bit values of the second subset of bits from each message of the second subset of messages.

Aspect 24: The method of any of aspects 18 through 23, wherein the first message type comprises transport blocks, or channel state information reports, or a combination thereof.

Aspect 25: An apparatus for wireless communication at a first wireless device, comprising a processor; memory coupled with the processor; and instructions stored in the memory and executable by the processor to cause the apparatus to perform a method of any of aspects 1 through 17.

Aspect 26: An apparatus for wireless communication at a first wireless device, comprising at least one means for performing a method of any of aspects 1 through 17.

Aspect 27: A non-transitory computer-readable medium storing code for wireless communication at a first wireless device, the code comprising instructions executable by a processor to perform a method of any of aspects 1 through 17.

Aspect 28: An apparatus for wireless communication at a first wireless device, comprising a processor; memory coupled with the processor; and instructions stored in the memory and executable by the processor to cause the apparatus to perform a method of any of aspects 18 through 24.

Aspect 29: An apparatus for wireless communication at a first wireless device, comprising at least one means for performing a method of any of aspects 18 through 24.

Aspect 30: A non-transitory computer-readable medium storing code for wireless communication at a first wireless device, the code comprising instructions executable by a processor to perform a method of any of aspects 18 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first wireless device, comprising:
   communicating, with a second wireless device, a first plurality of messages of a first message type that are acknowledged according to an acknowledgement procedure;
   selecting, based at least in part on the first plurality of messages being acknowledged and according to a sampling configuration common to both the first wireless device and the second wireless device, a first subset of messages of the first plurality of messages and a first subset of bits from each message of the first subset of messages;
   generating a key using bit values of the first subset of bits from each message of the first subset of messages;
   encoding a message using the key; and
   transmitting the encoded message to the second wireless device.

2. The method of claim 1, wherein the sampling configuration comprises a sampling frequency for a systematic sampling of the first plurality of messages, one or more indices indicating bits to sample from selected messages of the first plurality of messages, an indication of the first message type, or any combination thereof.

3. The method of claim 1, further comprising:
   receiving the sampling configuration from the second wireless device, wherein the first wireless device comprises a first user equipment (UE) and the second wireless device comprises a base station or a second UE; or
   transmitting the sampling configuration to the second wireless device, wherein the first wireless device comprises the base station or the second UE and the second wireless device comprises the first UE.

4. The method of claim 1, further comprising:
   communicating, with the second wireless device, a second plurality of messages of the first message type after the first plurality of messages of the first message type are communicated;
   selecting, according to the sampling configuration, the first subset of bits from a message of the second plurality of messages of the first message type;
   removing, from the key, the first subset of bits associated with a first message of the first subset of messages of the first plurality of messages; and
   adding, to the key, the first subset of bits from the message of the second plurality of messages of the first message type.

5. The method of claim 1, further comprising:
   communicating, with the second wireless device, a second plurality of messages of the first message type after the first plurality of messages of the first message type are communicated;
   selecting, according to the sampling configuration, a second subset of messages of the second plurality of messages and a second subset of bits from each message of the second subset of messages; and
   generating an updated key using bit values of the second subset of bits from each message of the second subset of messages.

6. The method of claim 1, further comprising:
   communicating, with the second wireless device, a second plurality of messages of a second message type that are acknowledged according to the acknowledgement procedure; and
   selecting, according to the sampling configuration, a second subset of messages of the second plurality of messages and a second subset of bits from each message of the second subset of messages, wherein the key is generated both using the bit values of the first subset of bits from each message of the first subset of messages and using bit values of the second subset of bits from each message of the second subset of messages.

7. The method of claim 6, wherein:
   communicating the first plurality of messages comprises receiving the first plurality of messages from the second wireless device or transmitting the first plurality of messages to the second wireless device; and communicating the second plurality of messages comprises receiving the second plurality of messages from the second wireless device or transmitting the second plurality of messages to the second wireless device.

8. The method of claim 1, wherein selecting the first subset of messages of the first plurality of messages comprises:

receiving, from the second wireless device, a first message of the first plurality of messages and a second message of the first plurality of messages;

transmitting, to the second wireless device, a positive acknowledgement in response to a successful decoding of the first message and a negative acknowledgement in response to an unsuccessful decoding of the second message;

selecting the first message as one of the first subset of messages based at least in part on transmitting the positive acknowledgement for the first message; and determining to exclude the second message as one of the first subset of messages based at least in part on transmitting the negative acknowledgement for the second message.

9. The method of claim 1, wherein selecting the first subset of messages of the first plurality of messages comprises:

transmitting, to the second wireless device, a first message of the first plurality of messages and a second message of the first plurality of messages;

receiving, from the second wireless device, a positive acknowledgement in response to a successful decoding of the first message and a negative acknowledgement in response to an unsuccessful decoding of the second message;

selecting the first message as one of the first subset of messages based at least in part on transmitting the positive acknowledgement for the first message; and determining to exclude the second message as one of the first subset of messages based at least in part on transmitting the negative acknowledgement for the second message.

10. The method of claim 1, wherein selecting the first subset of messages and the first subset of bits, and generating the key, and encoding the message using the key are performed at a physical layer of the first wireless device, the message received from a media access control layer before being encoded using the key.

11. The method of claim 10, wherein the encoded message lacks security encoding performed at a layer of the first wireless device higher than the physical layer.

12. The method of claim 1, wherein the first message type comprises transport blocks, or channel state information reports, or a combination thereof.

13. The method of claim 1, wherein the first message type comprises unicast messages.

14. The method of claim 1, wherein the sampling configuration indicates a threshold duration of time over which the communicating of the first subset of messages is to occur, and the selecting of the first subset of messages of the first plurality of messages is based at least in part on the first subset of messages satisfying the threshold duration of time.

15. The method of claim 1, wherein at least a first message of the first subset of messages is associated with a first location of the second wireless device, and at least a second message of the first subset of messages is associated with a second location of the second wireless device different than the first location.

16. The method of claim 1, wherein the communicating of the first plurality of messages are associated with a first one or more locations of the second wireless device, the method further comprising:

communicating, with the second wireless device, a second plurality of messages that are associated with a second location of the second wireless device, the second location being different from the first one or more locations; and updating, based at least in part on the second wireless device communicating the second plurality of messages associated with the second location, the key using a subset of messages of the second plurality of messages according to the sampling configuration, wherein a first set of bits of the key are associated with a first location of the first one or more locations and a second set of bits of the key are associated with the second location.

17. The method of claim 1, wherein the communicating of the first plurality of messages are associated with a first location of the second wireless device, the method further comprising:

communicating, with the second wireless device, a second plurality of messages associated with the first location of the second wireless device;

communicating a signal indicating to refrain from transmitting encrypted messages based at least in part on determining that the second plurality of messages are associated with a same location of the first wireless device as the first plurality of messages; and transmitting, to the second wireless device, a second message that is an unencrypted message based at least in part on determining that the second plurality of messages are associated with a same location of the first wireless device as the first plurality of messages.

18. A method for wireless communication at a first wireless device, comprising:

communicating, with a second wireless device, a first plurality of messages of a first message type that are acknowledged according to an acknowledgement procedure;

selecting, according to a sampling configuration common to both the first wireless device and the second wireless device, a first subset of messages of the first plurality of messages and a first subset of bits from each message of the first subset of messages;

generating a key using bit values of the first subset of bits from each message of the first subset of messages;

receiving a message from the second wireless device; and performing a decoding procedure on the message using the key.

19. The method of claim 18, further comprising:

communicating the sampling configuration with the second wireless device, wherein the sampling configuration comprises a sampling frequency for a systematic sampling of the first plurality of messages, one or more indices indicating bits to sample from selected messages of the first plurality of messages, an indication of the first message type, or any combination thereof.

20. The method of claim 18, further comprising:

receiving the sampling configuration from the second wireless device, wherein the first wireless device comprises a first user equipment (UE) and the second wireless device comprises a base station or a second UE; or transmitting the sampling configuration to the second wireless device, wherein the first wireless device comprises the base station or the second UE and the second wireless device comprises the first UE.

21. The method of claim 18, further comprising:

communicating, with the second wireless device, a second plurality of messages of the first message type after the first plurality of messages of the first message type are communicated;

selecting, according to the sampling configuration, the first subset of bits from a message of the second plurality of messages of the first message type;

removing, from the key, the first subset of bits associated with a first message of the first subset of messages of the first plurality of messages; and adding, to the key, the first subset of bits from the message of the second plurality of messages of the first message type.

22. The method of claim 18, further comprising:

communicating, with the second wireless device, a second plurality of messages of the first message type after the first plurality of messages of the first message type are communicated;

selecting, according to the sampling configuration, a second subset of messages of the second plurality of messages and a second subset of bits from each message of the second subset of messages; and generating an updated key using bit values of the second subset of bits from each message of the second subset of messages.

23. The method of claim 18, further comprising:

communicating, with the second wireless device, a second plurality of messages of a second message type that are acknowledged according to the acknowledgement procedure; and selecting, according to the sampling configuration, a second subset of messages of the second plurality of messages and a second subset of bits from each message of the second subset of messages, wherein the key is generated both using the bit values of the first subset of bits from each message of the first subset of messages and using bit values of the second subset of bits from each message of the second subset of messages.

24. The method of claim 18, wherein the first message type comprises transport blocks, or channel state information reports, or a combination thereof.

25. An apparatus for wireless communication at a first wireless device, comprising:

a processor;

memory coupled with the processor; and instructions stored in the memory and executable by the processor to cause the apparatus to:

communicate, with a second wireless device, a first plurality of messages of a first message type that are acknowledged according to an acknowledgement procedure;

select, based at least in part on the first plurality of messages being acknowledged and according to a sampling configuration common to both the first wireless device and the second wireless device, a first subset of messages of the first plurality of messages and a first subset of bits from each message of the first subset of messages;

generate a key using bit values of the first subset of bits from each message of the first subset of messages;

encode a message using the key; and transmit the encoded message to the second wireless device.

26. The apparatus of claim 25, wherein the sampling configuration comprises a sampling frequency for a systematic sampling of the first plurality of messages, one or more indices indicating bits to sample from selected messages of the first plurality of messages, an indication of the first message type, or any combination thereof.

27. The apparatus of claim 25, wherein the instructions are further executable by the processor to cause the apparatus to:

receive the sampling configuration from the second wireless device, wherein the first wireless device comprises a first user equipment (UE) and the second wireless device comprises a base station or a second UE; or transmit the sampling configuration to the second wireless device, wherein the first wireless device comprises the base station or the second UE and the second wireless device comprises the first UE.

28. The apparatus of claim 25, wherein the instructions are further executable by the processor to cause the apparatus to:

communicate, with the second wireless device, a second plurality of messages of the first message type after the first plurality of messages of the first message type are communicated;

select, according to the sampling configuration, the first subset of bits from a message of the second plurality of messages of the first message type;

remove, from the key, the first subset of bits associated with a first message of the first subset of messages of the first plurality of messages; and add, to the key, the first subset of bits from the message of the second plurality of messages of the first message type.

29. The apparatus of claim 25, wherein the instructions are further executable by the processor to cause the apparatus to:

communicate, with the second wireless device, a second plurality of messages of the first message type after the first plurality of messages of the first message type are communicated;

select, according to the sampling configuration, a second subset of messages of the second plurality of messages and a second subset of bits from each message of the second subset of messages; and generate an updated key using bit values of the second subset of bits from each message of the second subset of messages.

30. An apparatus for wireless communication at a first wireless device, comprising:

a processor;

memory coupled with the processor; and instructions stored in the memory and executable by the processor to cause the apparatus to:

communicate, with a second wireless device, a first plurality of messages of a first message type that are acknowledged according to an acknowledgement procedure;

select, according to a sampling configuration common to both the first wireless device and the second wireless device, a first subset of messages of the first plurality of messages and a first subset of bits from each message of the first subset of messages;

generate a key using bit values of the first subset of bits from each message of the first subset of messages;
receive a message from the second wireless device; and
perform a decoding procedure on the message using the key.

* * * * *